United States Patent
Kim et al.

(10) Patent No.: US 9,009,774 B2
(45) Date of Patent: Apr. 14, 2015

(54) METHOD AND AN APPARATUS FOR PROCESSING A BROADCAST SIGNAL INCLUDING AN INTERACTIVE BROADCAST SERVICE

(71) Applicant: LG Electronics Inc., Seoul (KR)

(72) Inventors: Kyungho Kim, Seoul (KR); Gomer Thomas, Arlington, VA (US); Seungjoo An, Seoul (KR); Jinpil Kim, Seoul (KR); Sejin Oh, Seoul (KR); Kyoungsoo Moon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/506,277

(22) Filed: Oct. 3, 2014

(65) Prior Publication Data

US 2015/0026742 A1 Jan. 22, 2015

Related U.S. Application Data

(63) Continuation of application No. 14/321,540, filed on Jul. 1, 2014, now Pat. No. 8,881,221, which is a continuation of application No. 13/961,684, filed on Aug. 7, 2013, now Pat. No. 8,806,561.

(60) Provisional application No. 61/680,279, filed on Aug. 7, 2012.

(51) Int. Cl.
| | |
|---|---|
| *H04N 7/08* | (2006.01) |
| *H04N 7/16* | (2011.01) |
| *H04N 21/6543* | (2011.01) |
| *H04N 21/858* | (2011.01) |
| *H04N 21/2665* | (2011.01) |
| *H04N 21/435* | (2011.01) |
| *H04N 21/462* | (2011.01) |
| *H04N 21/8545* | (2011.01) |

(52) U.S. Cl.
CPC ....... *H04N 21/6543* (2013.01); *H04N 21/8586* (2013.01); *H04N 21/2665* (2013.01); *H04N 21/435* (2013.01); *H04N 21/4622* (2013.01); *H04N 21/8545* (2013.01)

(58) Field of Classification Search
CPC . H04N 5/4401; H04N 5/445; H04N 21/4884; H04N 21/4345; H04N 21/235; H04N 21/478; H04N 21/23418; H04N 21/4622; H04N 7/0888; H04N 7/0882; H04N 7/0885; H04N 7/173; H04N 21/23617; H04N 21/435; H04N 7/17309
USPC ......... 725/116, 100, 137, 131, 136, 139, 151, 725/143; 348/723–726, 600, 589, 468, 465
IPC .................. H04N 7/08, 7/16, 7/173, 9/74, 9/76, H04N 5/38, 5/44
See application file for complete search history.

(56) References Cited

U.S. PATENT DOCUMENTS

| | | |
|---|---|---|
| 2005/0034155 A1 | 2/2005 | Gordon et al. |
| 2011/0302611 A1 | 12/2011 | Eyer |
| 2013/0250173 A1 | 9/2013 | Eyer |

FOREIGN PATENT DOCUMENTS

| | | |
|---|---|---|
| KR | 10-2009-0127839 | 12/2009 |
| WO | 2011-112053 | 9/2011 |
| WO | 2012-091322 | 7/2012 |

*Primary Examiner* — Sherrie Hsia
(74) *Attorney, Agent, or Firm* — McKenna Long & Aldridge LLP

(57) ABSTRACT

A method of processing a broadcast signal including an interactive broadcast service at a transmitter is disclosed. The method comprises generating an parameter table containing metadata about applications and interactive broadcast events targeted to the applications, dividing the parameter table into a plurality of parameter blocks, inserting each of the parameter blocks into each of a plurality of parameter table sections, generating a trigger which is a signaling element to identify signaling and establish timing of playout of the interactive broadcast events, inserting the trigger into a closed caption channel of the broadcast signal, transmitting the broadcast signal including the closed caption channel and a specific channel carrying the plurality of parameter table sections, wherein the trigger includes location information specifying a location of the parameter table in the broadcast signal.

14 Claims, 14 Drawing Sheets

FIG. 3

| Element/Attribute (with @) | No. allowed | Data Type | Description & Value |
|---|---|---|---|
| TPT | | | |
| @majorProtocolVersion | 1 | Integer, range 0..15 | Major Protocol Version |
| @minorProtocolVersion | 0..1 | integer, range 0..15 | Minor Protocol version |
| @id | 1 | anyURI | segment_id = domain_name/ program_id |
| @tptVersion | 1 | unsignedByte | Data version of this TPT |
| @expireDate | 0..1 | dateTime | Date after which this TPT will not be used |
| @serviceId | 0..1 | UnsignedShort | NRT service_id |
| @baseURL | 0..1 | anyURI | Base URL for all relative URLs in TPT |
| Capabilities | 0..1 | nrt:CapabilitiesType | Essential capabilities for this segment |
| LiveTrigger | 0..1 | | Info on Internet live trigger delivery |
|     @URL | 1 | anyURI | URL of server fo live triggers |
|     @pollPeriod | 0..1 | UnsignedByte | Short polling period in seconds |
| TDO | 1..N | | TDO for this segment |
|     @appID | 1 | unsignedShort | Application ID. for reference by trigger |
|     @appType | 0..1 | integer, range 0-15 | Applicationtype (default: 1="TDO") |
|     @appName | 0..1 | string | Display name (for viewer launch consent) |
|     @globalId | 0..1 | anyURI | Globally unique app ID |
|     @appVersion | 0..1 | unsignedByte | Version of this app |
|     @cookieSpace | 0..1 | UnsignedByte | Persistent storage needed; default=0 |
|     @frequencyOfUse | 0..1 | integer, range 0..15 | code values TBD |
|     @expireDate | 0..1 | dateTime | Expire date for caching |
|     @testTDO | 0..1 | boolean | Flag for test TDO; default="false" |
|     @availInternet | 0..1 | boolean | Default="true" |
|     @availBroadcast | 0..1 | boolean | Default="true" |
|     URL | 1..N | anyURI | TDO URL(s) -- first URL is entry point |
|     Capabilities | 0..1 | nrt:CapabilitiesType | Essential capabilities to present this TDO |

FIG. 4

| | ContentItem | 0..N | | Content item used by this TDO |
|---|---|---|---|---|
| | URL | 1..N | anyURI | URL(s) of content items |
| | @updatesAvail | 0..1 | boolean | Default="false" |
| | @pollPeriod | 0..1 | UnsignedByte | Short pollingperiod in seconds |
| | @size | 0..1 | 24-bit integer | Size of content item, in kilobytes |
| | @availInternet | 0..1 | boolean | Default="true" |
| | @availBroadcast | 0..1 | boolean | Default="true" |
| Event | | 1..N | | Event targeted to this TDO |
| | @eventId | 1 | unsignedShort | Event ID, for reference by trigger |
| | @action | 1 | unsignedByte | "register", etc.; code values TBD |
| | @destination | 0..1 | unsignedByte | Targeted device type, e.g., HDTV, SDTV, external_1, etc.; code values TBD |
| | @diffusion | 0..1 | unsignedByte | Period for applying diffusion in seconds |
| | Data | 0..1 | base64Binary | Data to be used by this TDO for stream-event |

FIG. 5

| Syntax | No. of Bits | Format |
|---|---|---|
| capabilities_descriptor() { | | |
|     descriptor_tag | 8 | 0xC5 |
|     descriptor_length | 8 | uimsbf |
|     Individual_capability_codes() { | | |
|         capability_code_count | 8 | uimsbf |
|         for (i=0; i<capability_code_count; i++) { | | |
|             essential_indicator | 1 | bslbf |
|             capability_code | 7 | uimsbf |
|             if (capability_code > 0x6F) { | | |
|                 format_identifier | 32 | |
|             } | | |
|         } | | |
|     } | | |
|     Individual_capability_strings() { | | |
|         capability_string_count | 8 | uimsbf |
|         for (i=0; i<capability_string_count; i++) { | | |
|             essential_indicator | 1 | |
|             capability_category_code | 7 | |
|             capability_category_length | 8 | uimsbf |
|             capability_string() | var | uimsbf |
|         } | | |
|     } | | |
|     capability_or_sets() { | | |
|         capability_or_sets_count | 8 | bslbf |
|         for (i=0; i<capability_or_sets_count; i++) { | | |
|             essential_indicator | 1 | bslbf |
|             capability_codes_in_set_count | 7 | uimsbf |
|             for (i=0; i<capability_codes_in_set_count; i++) { | | |
|                 reserved | 1 | |
|                 capability_code | 7 | uimsbf |
|                 if (capability_code > 0x6F) { | | |
|                     format_identifier | 32 | uimsbf |
|                 } | | |
|             } | | |
|             capability_strings_in_set_count | 8 | uimsbf |
|             for (i=0; i<capability_strings_in_set_count; i++) { | | |
|                 reserved | 1 | |
|                 capability_category_code | 7 | |
|                 capability_string_length | 8 | uimsbf |
|                 capability_string() | var | uimsbf |
|             } | | |
|         } | | |
|     } | | |
|     for (j=0; j<N; j++) { | | |
|         reserved | 8 | bslbf |
|     } | | |
| } | | |

FIG. 6

| Element/Attribute (with @) | No. allowed | Data Type | Description & Value |
|---|---|---|---|
| AMT | | | |
| @majorProtocolVersion | 1 | Integer 0-15 | Major protocol version |
| @minorProtocolVersion | 0..1 | Integer 0-15 | Minor protocol version |
| @segmentId | 1 | anyURI | domain_name/ program_id = segment id |
| @beginMT | 0..1 | unsignedInt | Start time of this segment time scope |
| Activation | 1..N | | Activation message |
| @targetTDO | 1 | unsignedShort | Target TDO appId |
| @targetEvent | 1 | unsignedShort | Target Event eventId |
| @startTime | 1 | unsignedInt | Start time of action period |
| @endTime | 0..1 | unsignedInt | End time of action period |

FIG. 7

<domain name part> / <directory path> [ ? <parameters> ]

(a)

event_time = "e=" 1*digit [ "&t=" 1*7hexdigit ]
media_time = "m=" 1*7hexdigit
spread    = "s=" 1*digit (b)

FIG. 8

```
<?xml version="1.0" encoding="UTF-8"?>
<xs:schema xmlns:xs="http://www.w3.org/2001/XMLSchema">
  <xs:element name="UrlList">
    <xs:complexType>
      <xs:sequence>
        <xs:element name="TptUrl" type="xs:anyURI" minOccurs="0" maxOccurs="unbounded"/>
        <xs:element name="NrtSignalingUrl" type="xs:anyURI" minOccurs="0"/>
      </xs:sequence>
    </xs:complexType>
  </xs:element>
</xs:schema>
```

FIG. 9

| Element/Attribute (with @) | No. allowed | Data Type | Description & Value |
|---|---|---|---|
| UrlList | | | List of potentially useful URLs |
|    TptUrl | 0..N | anyURI | URL of TPT for future segment |
|    NrtSignalingUrl | 0..1 | anyURI | URL of NRT Signaling Server |
|    UrsUrl | 0..1 | anyURI | URL of Usage Reporting Server or location of a usage reporting TDO |

FIG. 10

```
Trigger     = locator_part [ "?" terms ]

locator_part = hostname "/" path_segments hostname    = *( domainlabel "." ) toplabel
domainlabel = alphanum | alphanum *( alphanum | "-" ) alphanum
toplabel    = alpha | alpha *( alphanum | "-" ) alphanum path_segments = segment *( "/" segment )
segment     = 1*alphanum terms       = ( event_time | media_time ) [ "&" spread ] [ "&" others ]
event_time  = "e=" 1*digit [ "&t=" 1*7hexdigit ]
media_time  = "m=" 1*7hexdigit
others      = other [ "&" other ]
other       = resv_cmd "=" 1*alphanum
spread      = "s=" 1*digit
resv_cmd    = <any alphanum except "c", "e", "E", "m", "M", "s", "S", "t", or "T"> alphanum    = alpha | digit
alpha       = lowalpha | upalpha lowalpha = "a" | "b" | "c" | "d" | "e" | "f" | "g" | "h" | "i" |
           "j" | "k" | "l" | "m" | "n" | "o" | "p" | "q" | "r" |
           "s" | "t" | "u" | "v" | "w" | "x" | "y" | "z"
upalpha  = "A" | "B" | "C" | "D" | "E" | "F" | "G" | "H" | "I" |
           "J" | "K" | "L" | "M" | "N" | "O" | "P" | "Q" | "R" |
           "S" | "T" | "U" | "V" | "W" | "X" | "Y" | "Z"
digit    = "0" | "1" | "2" | "3" | "4" | "5" | "6" | "7" |
           "8" | "9"
hexdigit = "0" | "1" | "2" | "3" | "4" | "5" | "6" | "7" |
           "8" | "9" | "a" | "b" | "c" | "d" | "e" | "f"
```

FIG. 11

| Syntax | No. Bits | Format |
|---|---|---|
| binary_tdo_parameters_table { | | |
|     reserved | 2 | '11' |
|     expire_date_included | 1 | bslbf |
|     segment_id_length | 5 | uimsbf |
|     segment_id | var | bslbf |
|     base_URL_length | 8 | uimsbf |
|     base_URL | var | bslbf |
|     If (expire_date_included=='1') { | | |
|         expire_date | 32 | usmsbf |
|     } | | |
|     trigger_server_URL_length | 8 | uimsbf |
|     trigger_server_URL | var | bslbf |
|     If (trigger_server_URL_length != 0) { | | |
|         reserved | 7 | '1111' |
|         trigger_delivery_type | 1 | uimsbf |
|         if (trigger_delivery_type == 0) { | | |
|             poll_period | 8 | uimsbf |
|         } | | |
|     } | | |
|     num_apps_in_table | 8 | uimsbf |
|     for (k=0; k< num_apps_in_table; k++) { | | |
|         app_id | 16 | uimsbf |
|         app_type_included | 1 | bslbf |
|         app_name_included | 1 | bslbf |

FIG. 12

| | | |
|---|---|---|
| global_id_included | 1 | bslbf |
| app_version_included | 1 | bslbf |
| cookie_space_included | 1 | bslbf |
| frequency_of_use_included | 1 | bslbf |
| expire_date_included | 1 | bslbf |
| reserved | 1 | '1' |
| If (app_type_included=='1') { | | |
|     app_type | 8 | uimsbf |
| } | | |
| If (app_name_included == '1') { | | |
|     app_name_length | 8 | uimsbf |
|     app_name | Var | bslbf |
| } | | |
| If (global_id_included == '1') { | | |
|     global_id_length | 8 | uimsbf |
|     global_id | Var | bslbf |
| } | | |
| If (app_version_included=='1') { | | |
|     app_version | 8 | uimsbf |
| } | | |
| If (cookie_space_included=='1') { | | |
|     cookie_space | 8 | uimsbf |
| } | | |
| if (frequency_of_use_included) { | | |
|     frequency_of_use | 8 | uimsbf |

FIG. 13

| | | |
|---|---|---|
| } | | |
| if (expire_date_included) { | | |
|     expire_date | 32 | uimsbf |
| } | | |
| test_app | 1 | bslbf |
|     available_on_internet | 1 | bslbf |
|     available_in_broadcast | 1 | bslbf |
| reserved | 1 | '1' |
| number_URLs | 4 | |
| for (j=0; j<number_URLs; j++) { | | |
|     URL_length | 8 | uimsbf |
|     URL | var | |
| } | | |
| number_content_items | 8 | uimsbf |
| for (j=0; j<number_content_items;j++) { | | |
|     updates_avail | 1 | bslbf |
|     avail_internet | 1 | bslbf |
|     avail_broadcast | 1 | bslbf |
|     content_size_included | 1 | bslbf |
|     number_URLs | 4 | uimsbf |
|     for (i=0; i<number_URLs; i++) { | | |
|         URL_length | 8 | uimsbf |
|         URL | var | bslbf |
|     } | | |
|     if (content_size_included) { | | |

FIG. 14

| | | |
|---|---|---|
| content_size | 24 | uimsbf |
| } | | |
| num_content_descriptors | 8 | uimsbf |
| for (i=0; i<num_content_descriptors; i++) { | | |
|     content_descriptor() | var | bslbf |
| } | | |
| } | | |
| number_events | 16 | uimsbf |
| for (i=0; i<num_events; i++) { | | |
|     event_id | 16 | uimsbf |
|     action | 5 | uimsbf |
|     destination_included | 1 | bslbf |
|     diffusion_included | 1 | bslbf |
|     data_included | 1 | bslbf |
|     If (destination_included == ??) { | | |
|         destination | 8 | |
|     } | | |
|     If (diffusion_included == ??) { | | |
|         diffusion | | |
|     } | | |
|     If (data_included == ??) { | | |
|         data_size | 8 | |
|         data_bytes | var | bslbf |
|     } | 8 | uimsbf |
| } | | |

FIG. 15

|  | | |
|---|---|---|
| num app descriptors | 8 | uimsbf |
| for (i=0; i<num_app_descriptors; i++) { | | |
|     app_descriptor() | var | bslbf |
|     } | | |
| } | | |
| num_TPT_descriptors | 8 | uimsbf |
| for (i=0; i<num_TPT_descriptors; i++) { | | |
|     TPT_descriptor() | var | bslbf |
|     } | | |
| } | | |

FIG. 16

| Syntax | No. Bits | Format |
|---|---|---|
| tpt_section () { | | |
|     table_id | 8 | TBD |
|     section_syntax_indicator | 1 | '0' |
|     private_indicator | 1 | '1' |
|     reserved | 2 | '11' |
|     section_length | 12 | uimsbf |
|     table_id_extension { | | |
|         protocolversion | 8 | uimsbf |
|         sequence_number | 8 | uimsbf |
|     } | | |
|     reserved | 2 | '11' |
|     TPT_data_version | 5 | uimsbf |
|     current_next_indicator | 1 | '1' |
|     section_number | 8 | uimsbf |
|     last_section_number | 8 | uimsbf |
|     service_id | 16 | uimsbf |
|     tpt_bytes() | var | bslbf |
| } | | |

METHOD AND AN APPARATUS FOR PROCESSING A BROADCAST SIGNAL INCLUDING AN INTERACTIVE BROADCAST SERVICE

This application is a Continuation of application Ser. No. 14/321,540 filed on Jul. 1, 2014, which is a continuation of application Ser. No. 13/961,684 filed on Aug. 7, 2013, and claims the benefit of U.S. Patent Application No. 61/680,279, filed on Aug. 7, 2012, each of which are hereby incorporated by reference as if fully set forth herein.

BACKGROUND OF THE INVENTION

1. Field of the Invention

The present invention relates to a method and apparatus for providing, receiving and processing a broadcast signal and, more particularly, to a method and apparatus for providing broadcast content through a broadcast system and an interactive broadcast service associated therewith.

2. Discussion of the Related Art

With development of techniques such as broadcast network management, audio/video codec or a communication network used in a broadcast system, a broadcast system may provide higher-quality audio and video and a variety of content to viewers. Further, viewers wish to receive additional information related to broadcast content according to user experience (UX). In addition, viewers are increasingly dissatisfied with passive content consumption and instead prefer interactive content. However, a current broadcast system cannot satisfy viewer demands. For example, the current broadcast system cannot determine when additional information related to specific broadcast content is provided or how additional information is processed.

SUMMARY OF THE INVENTION

Accordingly, the present invention is directed to a method and apparatus for processing a broadcast signal including an interactive broadcast service that substantially obviates one or more problems due to limitations and disadvantages of the related art.

An object of the present invention is to provide additional information related to broadcast content at an appropriate time in the form of an interactive broadcast service in a process of playing the broadcast content back.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of processing a broadcast signal including an interactive broadcast service at a transmitter is disclosed. The method comprises generating an parameter table containing metadata about applications and interactive broadcast events targeted to the applications, dividing the parameter table into a plurality of parameter blocks, inserting each of the parameter blocks into each of a plurality of parameter table sections, generating a trigger which is a signaling element to identify signaling and establish timing of playout of the interactive broadcast events, inserting the trigger into a closed caption channel of the broadcast signal, transmitting the broadcast signal including the closed caption channel and a specific channel carrying the plurality of parameter table sections, wherein the trigger includes location information specifying a location of the parameter table in the broadcast signal.

Preferably, the parameter table section includes table ID field identifying the parameter table section, protocol version field indicating a major version number and a minor version number of definition of the parameter table, parameter table data version field indicating a version number of the parameter table, and sequence number field having a value same as that of all other parameter table sections of the parameter table.

Preferably, the inserting step comprises generating the plurality of parameter table sections having common value of the table ID field, protocol version field, parameter table data version field and sequence number field, and inserting each of the parameter blocks into each of the plurality of parameter table sections.

Preferably, the parameter table sections are transmitted in advance of use via non-real time transmission.

Preferably, the method further comprises encoding type information specifying that the trigger is transmitted via the closed caption channel of the broadcast signal, and inserting the encoded type information into the closed caption channel.

Preferably, the parameter table section further includes section number field specifying a section number of a parameter table section, and the section number is incremented by 1 with each additional parameter table section in the parameter table.

Preferably, the parameter table section further includes section number field specifying an order of the parameter table section in the plurality of parameter table sections.

Preferably, the parameter table section further includes service identification field specifying an identifier associated with the interactive broadcast service offering content items described in the parameter table.

In another aspect of the present invention, a receiver for processing a broadcast signal including an interactive broadcast service is disclosed. The receiver comprises receiving device configured to receive the broadcast signal including a closed caption channel and a specific channel carrying a plurality of parameter table sections, extracting device configured to extract a trigger which is a signaling element to identify signaling and establish timing of playout of interactive broadcast events from the closed caption channel of the broadcast signal, wherein the trigger includes location information specifying a location of a parameter table in the broadcast signal, trigger module configured to gather a plurality of parameter table sections each of which includes each of a plurality of parameter blocks based on the location information in the trigger, wherein the parameter table is divided into the plurality of parameter blocks, and form the parameter table containing metadata about applications and interactive broadcast events targeted to the applications using the plurality of parameter blocks and processor configured to provide the interactive broadcast service based on the formed parameter table.

Preferably, the parameter table section includes table ID field identifying the parameter table section, protocol version field indicating a major version number and a minor version number of definition of the parameter table, parameter table data version field indicating a version number of the parameter table, and sequence number field having a value same as that of all other parameter table sections of the parameter table.

Preferably, the trigger module further configured to gather the plurality of parameter table sections having common value of the table ID field, protocol version field, parameter table data version field and sequence number field, and extract each of the parameter blocks from each of the plurality of parameter table sections.

Preferably, the parameter table sections are transmitted in advance of use via non-real time transmission.

Preferably, the extracting device further configured to extract type information specifying that the trigger is transmitted via the closed caption channel of the broadcast signal.

Preferably, the parameter table section further includes section number field specifying a section number of a parameter table section, and the section number is incremented by 1 with each additional parameter table section in the parameter table.

Preferably, the parameter table section further includes section number field specifying an order of the parameter table section in the plurality of parameter table sections.

Preferably, the parameter table section further includes service identification field specifying an identifier associated with the interactive broadcast service offering content items described in the parameter table.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram showing a part of a TDO parameter table (TPT) according to an embodiment of the present invention;

FIG. 4 is a diagram showing another part of a TDO parameter table (TPT) according to an embodiment of the present invention;

FIG. 5 is a diagram showing a capabilities_descriptor according to an embodiment of the present invention;

FIG. 6 is a diagram showing an activation message table (AMT) according to an embodiment of the present invention;

FIG. 7 is a diagram showing a trigger format according to an embodiment of the present invention;

FIG. 8 is a diagram showing an XML schema for providing URL information which is a part of a response to a TPT request according to an embodiment of the present invention;

FIG. 9 is a diagram showing an XML schema for providing URL information which is a part of a response to a TPT request according to another embodiment of the present invention;

FIG. 10 is a diagram showing the syntax of a trigger according to an embodiment of the present invention;

FIG. 11 is a diagram showing a part of a TPT of a binary format according to an embodiment of the present invention;

FIG. 12 is a diagram showing another part of a TPT of a binary format according to an embodiment of the present invention;

FIG. 13 is a diagram showing another part of a TPT of a binary format according to an embodiment of the present invention;

FIG. 14 is a diagram showing another part of a TPT of a binary format according to an embodiment of the present invention;

FIG. 15 is a diagram showing another part of a TPT of a binary format according to an embodiment of the present invention;

FIG. 16 shows the structure of TPT section according to an embodiment of the present invention;

DETAILED DESCRIPTION OF THE INVENTION

Figure 1:
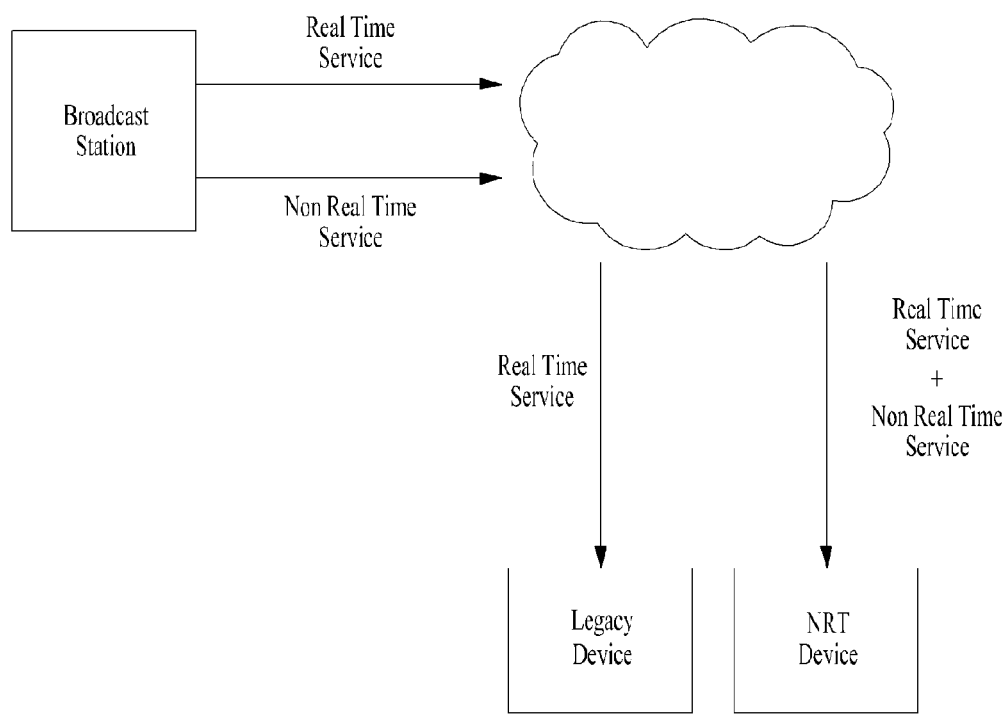
FIG. 1 is a diagram showing a concept of providing a real-time (RT) service and a non-real-time (NRT) service according to an embodiment of the present invention.

Hereinafter, preferred embodiments of the present invention will be described with reference to the accompanying drawings. The configuration and operation of the present invention shown in the drawings and described hereinafter will be described in at least one embodiment, without limiting the spirit and scope of the present invention.

Although the terms used in the present invention are selected from generally known and used terms, terms used herein may be varied depending on operator's intention or customs in the art, appearance of a new technology, or the like. In addition, some of the terms mentioned in the description of the present invention have been selected by the applicant at his or her discretion, the detailed meanings of which are described in relevant parts of the description herein. Furthermore, the present invention must be understood, not simply by the actual terms used but by the meanings of each term lying within.

Among terms used in the present invention, the term real-time (RT) service refers to a service provided in real time, that is, a service constrained by time. In contrast, a non-real-time (NRT) service refers to a service other than the RT service. That is, the non-real-time service is not constrained by time. Data for an NRT service is referred to as NRT service data.

A broadcast receiver according to the present invention may receive an NRT service through a medium such as a terrestrial wave, a cable or the Internet. The NRT service is stored in storage of a broadcast receiver and is displayed on a display device according to a predetermined time or a user request. In one embodiment of the present invention, the NRT service is received in the form of a file and is stored in storage. In one embodiment of the present invention, the storage is a built-in HDD mounted in a broadcast receiver. As another example, the storage may be a universal serial bus (USB) memory, an external HDD, etc. externally connected to a broadcast reception system. In order to receive and store files configuring an NRT service in storage and providing a service to a user, signaling information is necessary. In the present invention, signaling information is referred to as NRT service signaling information or NRT service signaling data. The NRT service according to the present invention may be divided into a fixed NRT service and a mobile NRT service according to a method of obtaining an IP datagram. In particular, the fixed NRT service is provided by a fixed broadcast receiver and the mobile NRT service is provided by a mobile broadcast receiver. The present invention will be described on the assumption that the fixed NRT service is provided. However, the present invention is applicable to the mobile NRT service.

Among terms used in the present invention, the term interactive adjunct service or interactive broadcast service refers to a data service or broadcast service for providing an interactive experience to a viewer in order to improve viewing experience. The interactive broadcast service includes a triggered declarative object (TDO), a declarative object (DO) or a non-real-time declarative object (NDO).

Among terms used in the present invention, the term trigger is a signaling element for identifying signaling and setting when an interactive service or interactive event is provided. The trigger may serve as a time base trigger and/or an activation trigger. The time base trigger is used to establish timing of playout of events. The activation trigger is used to set an operation time of an event. The below-described time base message may be used as the time based trigger or the time base trigger may be used as the time base message. The below-described activation message may be used as the activation trigger or the activation trigger may be used as the activation message.

The time base trigger transmits a timestamp sampled at a time clock, which will be described in detail below.

The activation trigger transmits information indicating a trigger operation or an event operation time.

A media time is a parameter for referring to a specific time when content is played back.

A declarative object (DO) may indicate an application or a display for displaying additional information related to broadcast content. The DO may indicate an application or a display for displaying an interactive service or an interactive event related to broadcast content. One DO may include one or more interactive events.

A triggered declarative object (TDO) indicates additional information of broadcast content. The TDO triggers additional information in broadcast content at an appropriate time. If a DO is executed by a trigger, this DO may be defined as a TDO. For example, if an audition program is broadcast, a current ranking of a preferred audition participant of a viewer may be displayed along with broadcast content. At this time, additional information of the current ranking of the audition participant may be a TDO. Such a TDO may be changed through interaction with a viewer and according to viewer's intention.

A non-real-time declarative object (NDO) may be defined as a DO provided as a part of an NRT service.

FIG. 1 is a diagram showing a concept of providing a real-time (RT) service and a non-real-time (NRT) service according to an embodiment of the present invention.

A broadcast station transmits an RT service according to an existing method, similarly to a current terrestrial broadcast (or mobile broadcast). At this time, the broadcast station may transmit an RT service and provide an NRT service using a bandwidth other than a bandwidth used when transmitting the RT service or a dedicated bandwidth. That is, the RT service and the NRT service are transmitted via the same channel or different channels. Accordingly, a broadcast receiver divides an RT service and an NRT service and stores and provides the NRT service to a user using NRT service signaling information (or NRT service signaling data) as needed. The NRT service signaling information (or NRT service signaling data) will be described in detail below. For example, a broadcast station may transmit broadcast service data in NT and transmit new clips, weather information, advertisements, push VOD, etc. in NRT. In addition, the NRT service may include specific scenes of RT broadcast streams, detailed information and preview of a specific program, etc. in addition to new clips, weather information, advertisements and push VOD.

A conventional broadcast receiver (that is, a legacy device) may receive and process an RT service but may not receive and process an NRT service. That is, operation of the conventional broadcast receiver (that is, the legacy device) is not influenced by NRT streams included in a channel for transmitting an NRT service. In other words, since the conventional broadcast receiver does not include a means for appropriately processing an NRT service, the conventional broadcast receiver cannot process the NRT service even when receiving the NRT service.

In contrast, a broadcast receiver (that is, an NRT device) according to the present invention can receive and appropriately process an NRT service combined with an RT service and thus can provide various functions to a viewer as compared with the conventional broadcast receiver.

In one embodiment of the present invention, one NRT service includes one or more content items (or content or NRT content) and one content item includes one or more files. In the present invention, a file and an object have the same meaning. The content item is an independent minimum playback unit. For example, if there are NRT news including business news, political news and lifestyle news, the news may be an NRT service and business news, political news and lifestyle news may be content items. Each of business news, political news and lifestyle news includes one or more files.

At this time, the NRT service may be transmitted through the same broadcast channel as the RT service or a dedicated broadcast channel in the form of MPEG-2 transport stream (TS) packets. In this case, in order to identify an NRT service, a unique PID is allocated to a TS packet of NRT service data. In one embodiment of the present invention, IP based NRT service data is packetized into an MPEG-2 TS and transmitted.

At this time, NRT service signaling data necessary to receive NRT service data is transmitted via an NRT serving signaling channel. The NRT service signaling channel is transmitted through a specific IP stream on an IP layer and, at this time, an IP stream is also packetized into an MPEG-2 TS and transmitted. The NRT service signaling data transmitted via the NRT service signaling channel includes an NRT service map table (SMT) and/or an NRT information table (NRT-IT). In one embodiment of the present invention, the SMT provides at least one NRT service executed at an IP layer and access information of content items/files configuring the NRT service. In one embodiment of the present invention, the NRT-IT provides detailed information of the content items/files configuring the NRT service. In the present invention, the SMT and the NRT-IT are referred to as a signaling information table.

According to one embodiment of the present invention, a TDO may be transmitted as an NRT service or an RT service in addition to broadcast content. In addition, a TDO may be transmitted via an Internet protocol network instead of a broadcast network.

Figure 2:
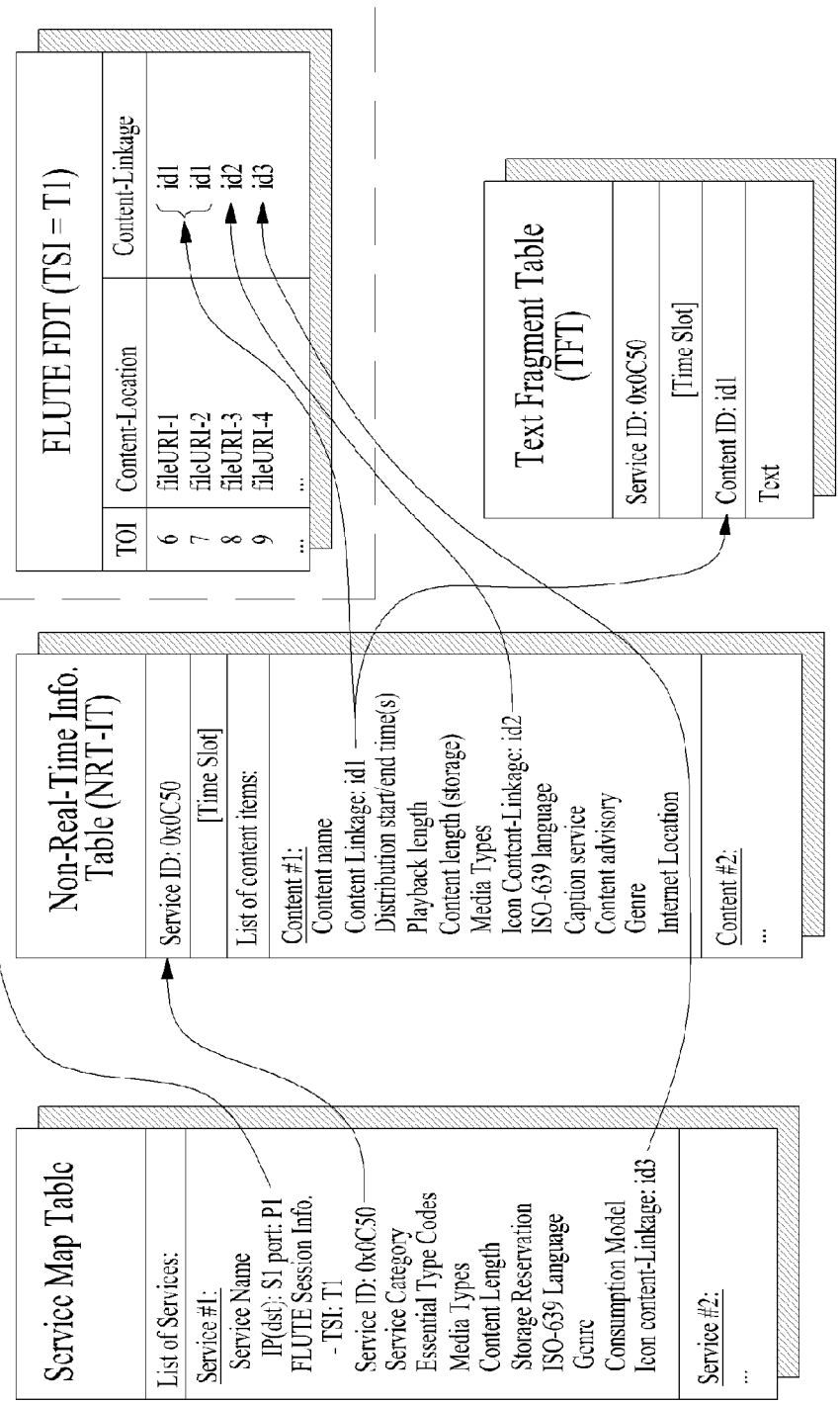
FIG. 2 is a diagram showing the structure for signaling an NRT service according to an embodiment of the present invention.

FIG. 2 is a diagram showing the structure for signaling an NRT service according to an embodiment of the present invention.

The SMT and NRT-IT according to one embodiment of the present invention may be transmitted via a channel having a specific IP address and port number, such as a service signaling channel (SSC).

The SMT according to one embodiment of the present invention may include signaling information for a plurality of NRT services and may include service name information, IP and port information, FLUTE session information, service ID information, service category information, content length information, storage reservation information, ISO-639 language information, genre information and/or icon content linkage information with respect to each NRT service.

The service name information indicates the name of the NRT service and may be used for interaction with a user. That is, the user may recognize the service using the NRT service name and request the service.

The IP and port information indicates the IP address and port number for providing the NRT service.

The FLUTE session information indicates a file delivery over unidirectional transport (FLUTE) session for transmitting a file related to the NRT service.

The service ID information is an identifier for identifying the NRT service. The service ID information may be used as a linkage with the NRT-IT.

The service category information indicates a category of the service and may indicate one of an RT service, an IP service, an EPG service or an NRT service.

The content length information indicates the length of content included in the NRT service.

The storage reservation information indicates capacity of storage reserved for receiving the NRT service.

The ISO-639 language information indicates a language used for the NRT service.

The genre information indicates the genre of the NRT service.

The icon content linkage information indicates linkage information of an icon describing the NRT service. The icon content linkage information is used for a receiver to receive an icon from an address indicated by content location information related to the content linkage if this information matches content-linkage information of a FLUTE file delivery table (FDT).

The NRT-IT according to one embodiment of the present invention may include information about a plurality of pieces of NRT content and may include service ID information, content name information, content linkage information, distribution start/end information, playback length information, content length information, media type information, icon content-linkage information, ISO-639 language information, caption service information, content advisory information, genre information and/or Internet location information with respect to each piece of content.

The content linkage information is used for a receiver to receive a file configuring NRT content from an address indicated by content location information related to the content linkage if this information matches content linkage information of a FLUTE FDT. The content linkage information may be used as a linkage for linking the NRT-IT and a text fragment table (TFT). The TFT includes a text fragment used to provide a description of the NRT service or NRT content. That is, the TFT transmits a data structure supporting a plurality of languages and the data structure includes data for providing a description of the NRT service or NRT content using a plurality of different languages.

The icon content linkage information is connection information of an icon describing the NRT content. The icon content linkage information is used for a receiver to receive an icon of NRT content from an address indicated by content location information related to the content linkage if this information matches content linkage information of a FLUTE FDT.

FIG. 3 is a diagram showing a part of a TDO parameter table (TPT) according to an embodiment of the present invention.

FIG. 4 is a diagram showing another part of a TDO parameter table (TPT) according to an embodiment of the present invention.

The TDO parameter table according to one embodiment of the present invention includes a TDO included in a segment and/or metadata of an event included in the TDO.

The TDO parameter table includes a TPT element, a MajorProtocolVersion element, a MinorProtocolVersion element, an id element, a tptVersion element, an expireDate element, a serviceID element, a baseURL element, a Capabilities element, a LiveTrigger element, a URL element, a pollPeriod element, a TDO element, an appID element, an appType element, an appName element, a globalID element, an appVersion element, a cookieSpace element, a frequencyOfUse element, an expireDate element, a testTDO element, an availInternet element, an availBroadcast element, a URL element, a Capabilities element, a ContentItem element, a URL element, a updatesAvail element, a pollPeriod element, a Size element, an availInternet element, an availBroadcast element, an Event element, an eventID element, an action element, a destination element, a diffusion element, and a Data element.

The TPT element is a root element of the TPT.

The MajorProtocolVersion element indicates a major version number of definition of a table. A receiver may discard a TPT having a major version number which is not supported by the receiver.

The MinorProtocolVersion element indicates a minor version number of definition of a table. A receiver does not discard a TPT having a minor version number which is not supported by the receiver. In this case, the receiver ignores the information or element which is not supported by the receiver so as to process the TPT.

The id element may have a URI form and identifies an interactive programming segment (or an interactive service segment) related to this TPT. This id element may become "locator_part" of a corresponding trigger.

The tptVersion element indicates version information of the TPT identified by the id element.

The expireDate element indicates an expiration date and time of information included in a TPT instance. When the receiver stores the TPT, the TPT may be reused until the date and time indicated by the expireDate element.

The serviceID element indicates the identifier of the NRT service related to an interactive service described in the TPT instance.

The baseURL element indicates a base URL combined and used in a front end of a URL in the TPT. The baseURL element indicates absolute URLs of files.

The Capabilities element indicates essential capabilities for displaying an interactive service related to the TPT. Information about capabilities will be described below with reference to FIG. 5.

The LiveTrigger element includes information used when an activation trigger is provided via the Internet. The LiveTrigger element provides information necessary for the receiver to obtain the activation trigger.

The URL element indicates the URL of a server for transmitting the activation trigger. The activation trigger may be transmitted via the Internet using HTTP short polling, HTTP long polling or HTTP streaming.

If the pollPeriod element is present, this indicates that short polling is used to transmit the activation trigger. The pollPeriod element indicates a polling period.

The TDO element includes information about an application (e.g., TDO) for providing a part of an interactive service during a segment described by a TPT instance.

The appID element identifies an application (e.g., TDO) within the range of the TPT. The activation trigger identifies a target application for applying a trigger using the appID element.

The appType element identifies a format type of an application. For example, if the value of the appType element is set to "1", then this indicates that the application is a TDO.

The appName element indicates the name of an application which is displayed to a viewer and is human-readable.

The globalID element indicates a global identifier of an application. If the global ID element is present, the receiver may store an application code and reuse the application code for later display of the same application in the segment of the same or different broadcast station.

The appVersion element indicates the version number of an application (TDO).

The cookieSpace element indicates the size of a space necessary to store data required by an application between application invocations.

The frequencyOfUse element indicates how frequently the application is used in a broadcast. For example, the frequencyOfUse element may indicate that the application is repeatedly used on a time-to-time, day-to-day, weekly or monthly basis or is used only once.

The expireDate element indicates a date and time when the receiver securely deletes an application and/or resources related thereto.

The testTDO element indicates whether the application is used for the purpose of testing. If the application is used for the purpose of testing, a general receiver may ignore this application.

The availInternet element indicates whether the application may be downloaded via the Internet.

The availBroadcast element indicates whether the application may be extracted from a broadcast signal.

Each instance of the URL element identifies a file which is a part of an application. If one or more instances are present, a first instance specifies a file which is an entry point. The file which is the entry point should be executed in order to execute the application.

The Capabilities element indicates capabilities of the receiver necessary to meaningfully display the application. Information about capabilities will be described below with reference to FIG. 5.

The ContentItem element includes information about a content item composed of one or more files required by the application. The URL element identifies a file which is a part of the content item. The URL element may identify URL information provided by the content item. If one or more instances are present, a first instance specifies a file which is an entry point.

The updatesAvail element indicates whether the content item can be updated. The updatesAvail element may indicate whether the content item is composed of static files or is an RT data feed.

If the pollPeriod element is present, short polling is used to transmit the activation trigger. The pollPeriod indicates a time used by the receiver as a polling period.

The Size element indicates the size of the content item.

The availInternet element indicates whether the content item may be downloaded via the Internet.

The availBroadcast element indicates whether the content item may be extracted from a broadcast signal.

The event element includes information about an event for a TDO.

The eventID element serves to identify an event within the range of the TDO. The activation trigger identifies a target application and/or event, to which a trigger is applied, using a combination of the appID element and the eventID element.

The action element indicates the type of a TDO action which should be applied when an event occurs. The action value of FIG. 11 may include the following meanings.

"register" means that resources of the application are acquired and pre-cached, if possible.

"suspend-execute" means that another application which is currently being executed is suspended and a current application is executed. If a target application is suspended, the receiver resumes the application in a previous state.

"terminate-execute" means that another application which is currently being executed is terminated and a current application is executed. If a target application is suspended, the receiver resumes the application in a previous state.

"terminate" means that the application is terminated.

"suspend" means that the application is suspended. A UI and/or application engine state is required to be preserved until the application is re-executed.

"stream_event" means that a specific action defined by the application is appropriately performed. The destination element indicates a target device type for an event. For example, the value of the destination element may indicate that the event is executed on a main screen and/or a secondary screen. The destination element may be used as a placeholder.

The diffusion element indicates a parameter for smoothing server peak load. The diffusion element may indicate a period T in seconds. The receiver may compute a random time in a range from 0 to T seconds and perform delay by the computed time before accessing an Internet server in order to obtain content referred to by URLs of the TPT.

The data element includes information about data related to the event. If the event occurs, the target application may read and use this data in order to perform desired operation.

FIG. 5 is a diagram showing a capabilities_descriptor according to an embodiment of the present invention.

The capabilities_descriptor according to the embodiment of the present invention includes descriptor_tag information, descriptor_length information, capability_code_count information, essential_indicator information, capability_code information, format_identifier information, capability_string_count information, essential_indicator information, capability_category_code information, capability_string_length information, capability_string( ) information, capability_or_set_count information, essential_indicator information, capability_codes_in_set_count information, capability_code information, format_identifier information, capability_strings_in_set_count information, capability_category_code information, capability_string_length information and/or capability_string( ) information.

The descriptor_tag information indicates that this descriptor is a capabilities_descriptor.

The descriptor_length information indicates the length of data included in this descriptor after this information.

The capability_code_count information indicates the count of capability_code information.

The essential_indicator information indicates whether capability identified by capability_code information is essentially supported, for meaningful display of an interactive service or content item.

The capability_code information identifies specific capabilities. For example, the capability_code information may be used to identify capability of a download protocol, an FEC algorithm, a Wrapper/Archive format, a compression algorithm and a media type according to the value thereof. For example, the capability_code information may indicate that a FLUTE protocol is used as the download protocol. For example, the capability_code information may indicate that an FEC scheme is not used or a Raptor algorithm is used as the FEC algorithm. For example, the capability_code information may indicate that a DEFLATE algorithm is used as the compression algorithm. For example, the capability_code information may indicate that the media type is AVC standard-definition video, AVC high-definition video, AC-3 audio, E-AC-3 audio, MP3 audio, AVC mobile video, HE AAC v2 mobile audio, HE AAC v2 lever 4 audio, DTS-HD audio, CFF-TT, CEA-708 caption and/or MPEG surround HE AAC v2.

The format_identifier information is equal to the definition of registration_descriptor( ) in section 2.6.9 of ISO/IEC 13818-1.

The capability_string_count information indicates the count of capability_string( ) information.

The essential_indicator information indicates whether capability of information about a capability string following this information is essentially supported, for meaningful display of an interactive service or content item.

The capability_category_code information indicates a capability category for a string value following this information. For example, the capability_category_code information may indicate a capability category of a download protocol, an FEC algorithm, a wrapper/archive format, a compression algorithm or a media type.

The capability_string_length information indicates the length of capability_string( ) information.

The capability_string( ) information includes information about capability. The capability_string( ) information includes information about the capability of the category identified by the capability_category_code information.

The capability_or_set_count information indicates the number of capabilities "OR set".

The essential_indicator information indicates whether capability "OR set" following this information is essentially supported, for meaningful display of an interactive service or content item.

The capability_codes_in_set_count information indicates the count of capability_code information in the capability set.

The capability_code information identifies specific capability. For example, the capability_code information may be used to identify capability of a download protocol, an FEC algorithm, a Wrapper/Archive format, a compression algorithm and a media type according to the value thereof. For example, the capability_code information may indicate that a FLUTE protocol is used as the download protocol. For example, the capability_code information may indicate that an FEC scheme is not used or a Raptor algorithm is used as the FEC algorithm. For example, the capability_code information may indicate a DEFLATE algorithm is used as the compression algorithm. For example, the capability_code information may indicate that the media type is AVC standard-definition video, AVC high-definition video, AC-3 audio, E-AC-3 audio, MP3 audio, AVC mobile video, HE AAC v2 mobile audio, HE AAC v2 lever 4 audio, DTS-HD audio, CFF-TT, CEA-708 caption and/or MPEG surround HE AAC v2.

The format_identifier information is equal to the definition of registration_descriptor( ) in section 2.6.9 of ISO/IEC 13818-1.

The capability_strings_in_set_count information indicates the count of capability_string information in the capability set.

The capability_category_code information indicates a capability category for a string value following this information. For example, the capability_category_code information may indicate a capability category of a download protocol, an FEC algorithm, a wrapper/archive format, a compression algorithm or a media type.

The capability_string_length information indicates the length of capability_string( ) information.

The capability_string( ) information includes information about capability. The capability_string( ) information includes information about the capability of the category identified by the capability_category_code information.

The capabilities_descriptor may be transmitted via a region in which the above-described elements or descriptors of the TPT may be included.

FIG. 6 is a diagram showing an activation message table (AMT) according to an embodiment of the present invention.

The activation message table may include a majorProtocolVersion element, a minorProtocolVersion element, a segmented element, a beginMT element, an Activation element, a targetTDO element, a targetEvent element, a startTime element and/or an endTime element.

The majorProtocolVersion element indicates a major version number of definition of the AMT. A receiver may discard an instance of the AMT indicating an unsupported major version number.

The minorProtocolVersion element indicates a minor version number of definition of the AMT. A receiver does not discard an instance of the AMT indicating an unsupported minor version number. In this case, the receiver may ignore an individual unsupported element or component included in the AMT.

The segmented element may match the identifier of the TPT including an event to which activation of the TDO and/or AMT will be applied and may be used as the identifier of the AMT.

The beginMT element indicates a beginning media time of a segment to which an activation time provided by an AMT instance is applied.

The Activation element indicates a command for operation of a specific event at a specific time.

The targetTDO element identifies a target TDO for an event to which an activation command will be applied.

The targetEvent element identifies a target event to which an activation command will be applied within the range of the target TDO.

The startTime element indicates a valid start time for an event related to a media time. The receiver may execute a command when the media time reaches the value of the startTime element.

The endTime element indicates the last of a valid time period for an event related to the media time. The receiver may not execute a command when the media time reaches the value of the endTime element.

FIG. 7 is a diagram showing a trigger format according to an embodiment of the present invention.

The activation message (or the activation trigger) and the time base message (or the time base trigger) may follow a general trigger format in a specific transmission environment.

FIG. 7(a) shows the format of a general trigger.

<domain name part> may indicate a registered domain name. <directory path> indicates a path expressed by a URL. Any one or a combination of <domain name part> and <directory path> may be used as a URL of an address or location on the Internet capable of acquiring a TPT for a current segment. <parameters> may include one or more of "event_time", "media_time" or "spread" elements.

FIG. 7(b) shows an example of a format indicating "event_time", "media_time" and "spread" elements.

The "element_time" element may identify a target event (use the format of "e=") or an event operation time (use the format of "t=") within the activation message. If the format of "t=" is not present, then this indicates that the event is executed when the activation message arrives.

The "media_time" element may identify a current time associated with a time base expressed by a time base message within the time base message.

The "spread" element may indicate delay by a random time in order to identify operation (e.g., reception of the TPT from the server) performed by the time base message or distribute workload of a server by operation (e.g., a TDO accessing the server).

Triggers can be delivered in the Broadcast Stream.

When triggers are delivered in the broadcast stream, Triggers shall be delivered in the DTV Closed Caption channel, in the URLString command, as specified in CEA-708.2 Digital Television (DTV) Closed Captioning: Interactive Television Extensions. If the Trigger is less than or equal to 26 characters in length, it shall be sent non-segmented (Type=11). If the Trigger is 27 to 52 characters in length, it shall be sent in two segments (the first segment in a Type=00 segment and the second segment in a Type=10 segment).

For interactive services using the TDO model, the URI_type field in the URI_data( ) structure shall be set to 0 (Interactive TV Trigger for TDO model). For interactive services using the Direct Execution model, the URI_type field shall be set to 2 (Interactive TV Trigger for Direct Execution model).

This delivery mechanism includes both Time Base Triggers and Activation Triggers.

The activation message may be delivered in a broadcast stream. In this case, the format of the trigger may include or may not include a format "e=" and a format "t=". At this time, the trigger may be delivered via a closed caption service region. That is, the trigger may be delivered via a channel for transmitting a closed caption service in a broadcast stream. If the format "t=" is present, the activation time is a timestamp associated with a time base. If the format "t=" is not present, the activation time indicates when a message arrives.

The time base message may be delivered in a broadcast stream. In this case, the format of the trigger may include or may not include a format "m=". The format "m=" indicates a media time. At this time, the time base message may be delivered via a closed caption service region. That is, a time base message may be delivered via a channel for a closed caption service in a broadcast stream. If the format "m=" is not included in the time base message, the time base message may be used to transmit the URL of a signaling server. If the format "m=" is not included in the time base message, the format "t=" may not be included in the activation message.

Activation messages can be delivered via Internet. When delivered via Internet, Activation messages shall be delivered using either or both of the following mechanisms. Firstly, individual Activation Trigger can be delivered. When individual Activation Triggers are delivered via the Internet, they shall be delivered using HTTP short polling, long polling or streaming. The format of the Activation Triggers shall be same as when they are delivered via broadcast stream. Secondly, bulk Activation Trigger can be delivered. When Activation Triggers are delivered via the Internet in bulk, the Activation Triggers for a segment shall be delivered via HTTP along with the TPT for the segment, in the form of a multi-part MIME message, with the TPT as the first part of the message, and an Activation Messages Table (AMT) as the second part of the message.

When Internet delivery of Activation Triggers is available, the URL attribute of the LiveTrigger element in the TPT indicates the Activation Trigger Server which can deliver them. If the pollPeriod attribute of the LiveTrigger element is present in the TPT, this indicates that HTTP short polling is being used, and it indicates the polling period a receiver should use. If the pollPeriod attribute of the LiveTrigger element is not present in the TPT, this indicates that either HTTP long polling or HTTP streaming is being used.

Regardless of which protocol is being used, the receiver is expected to issue an HTTP request to the Activation Trigger Server with the query term: "?mt=<media_time>", where <media_time> is the current media time of the viewed content.

If short polling is being used, the response from the Activation Trigger Server shall contain all the Triggers that have been issued within the time interval of length pollPeriod ending at <media_time>. If more than one Activation Trigger is returned, they shall be separated by one or more white space characters. If no Activation Triggers are returned, the response shall be empty.

If HTTP long polling or HTTP streaming is being used, the Activation Trigger Server shall wait to return a response until the media time when an Activation Trigger would be delivered in the broadcast stream. At this time it shall return the Activation Trigger.

If HTTP long polling is being used, the Activation Trigger Server shall close the session after returning an Activation Trigger. The receiver is expected to immediately issue another request, with an updated media time.

If HTTP streaming is being used, the Activation Trigger Server shall keep the session open after returning each Activation Trigger, and it shall deliver additional Activation Triggers over the session as the time arrives for them to be delivered.

In all cases the HTTP response shall contain an HTTP Response Header Field of one of the following forms to signal the delivery mode:

ATSC-Delivery-Mode: ShortPolling [<poll-period>]
ATSC-Delivery-Mode: LongPolling
ATSC-Delivery-Mode: Streaming The <poll-period> parameter shall indicate the recommended interval between polls for the succeeding polls.

If automatic content recognition (ACR) is applied to a broadcast receiver, an activation message may be delivered via the Internet. In this case, the format of the trigger may include a format "e=" and may or may not include a format "t=". The trigger format may be delivered using HTTP short polling, long polling or streaming. Alternatively, the trigger format may be delivered via HTTP in the form of a file.

The time base message may be delivered via the Internet. In the ACR environment, the broadcast receiver may not access a closed caption service included in a broadcast stream. In this situation, the receiver needs to recognize a video frame and synchronize the video frame and a time base. Accordingly, in the ACR environment, a time message may be delivered via the Internet. In this case, the time base message may be delivered in the form of a response from an ACR server. Alternatively, the time base message may be acquired from watermarks.

Through a process of generating a service for a segment, a folder including a TDO and another content item, a TPT file of an XML format and/or an activation message file (AMF) or an activation message table (AMT) of an XML format may be generated.

If the time base message and the activation message are delivered via a closed caption service, a method for processing the time base message and the activation message by a broadcaster may include a segment mode without an explicit time base, a segment with an explicit time base or a service mode with an explicit time base. Such modes may be mixed in a broadcast in segment units.

In segment mode without explicit time base, Activation messages include no time stamp, so that the activation time of each message is the delivery time of the message, and Time Base messages also include no time stamp, so that their only purpose is to provide the URL of the Signaling Server that can deliver TPT files. Time Base messages can even be omitted entirely in this mode, relying on the URL in the Activation messages to provide the URL of the Signaling Server, but then receivers will not be able to retrieve a TPT and start downloading TDOs until after the first Activation message appears, delaying the response to the first Activation message by quite a bit.

In this case Time Base messages that appear in CC service contain the "locator_part" of the "Trigger" format and possibly the "spread" term, but no "media_time" term, and Activation messages that appear in CC service #6 contain the "locator_part" of the "Trigger" format, the "event_time" term, and possibly the "spread" term, but with no "t=" part in the "event_time" term. The "locator_part" of both Time Base and Activation messages is the current segmentId. This URL can also be used to retrieve the TPT for the segment via the Internet.

In segment mode with explicit time base, Time Base messages include a time stamp, to define a time base, and Activation messages might include a time stamp, to define the activation time relative to the time base, or they might include no time stamp, indicating that the activation time is the arrival time of the message.

In this case Time Base messages that appear in CC service contain the "locator_part" of the "Trigger" format, the "media_time" term, and possibly the "spread" term, and Activation messages that appear in CC service contain the "locator_part" of the "Trigger" format, the "event_time" term, and possibly the "spread" term, with or without the "t=" part in the "event_time" term. The "locator_part" of both Time Base and Activation messages is the current segmentId, and the time base is specific to the segment. This URL can also be used to retrieve the TPT for the segment via the Internet.

In service mode with explicit time base, Time Base messages include a time stamp, to define a time base, and Activation messages might or might not include a time stamp. The time base extends across multiple segments, rather than being specific to a single segment. The "locator_part" of the Time Base messages is an identifier of the time base, and also a URL that can be used to retrieve TPTs for the service via the Internet.

In any case the Trigger Insertion Server that inserts the triggers into CC service should work from the AMF, translating the Activation messages from the XML format in the AMF into the trigger format specified for delivery in CC service. In the case of an Activation element with no endTime attribute, a single trigger should be inserted with activation time equal to the startTime attribute. In the case of an Activation element with both startTime and endTime elements, a sequence of triggers should be inserted with the same targetId value. The first trigger in the sequence should have activation time equal to the startTime attribute, the last trigger in the sequence should have activation time equal to the endTime attribute, and there should be a fixed time interval between the activation times of the triggers in the sequence (except that the interval between the next-to-last and last trigger in the sequence can be shorter). The length of this fixed time interval should be configurable.

When the Time Base and Activation messages are in segment mode, the time base is specific to the segment. It starts with the "beginMT" value at the beginning of the segment, and runs through the segment. The "startTime" and "endTime" values of individual Activations are relative to the "beginMT" value. When the Time Base and Activation messages are in service mode, the time base spans segments, and the "beginMT" value for each segment is adjusted to take account of the service time base and the broadcast schedule.

Time Base Messages and/or Activation Messages can be delivered via Internet.

The only time it is necessary to deliver Time Base and Activation messages via the Internet is situations where a receiver does not have access to CC service, for example, in ACR situations. In this case Time Base messages come from the ACR server. Activation messages can be delivered via short polling, long polling or streaming, but all of these impose a lot of overhead on the receivers and the server. Activation messages can also be delivered in the form of an AMF, but this provides a good deal of information about the length of segments, facilitating ad killers. There might be other alternatives.

TPTs can be delivered via Broadcast.

For delivery via broadcast, TPTs are translated from their XML format into an equivalent binary format, and then encapsulated in NRT-style table instances for delivery in the broadcast, one TPT per table instance. The TPT for the current segment is always present. TPTs for one or more future segments may also be present.

TPTs can be delivered via Internet.

When delivered via Internet, TPTs are delivered as individual files or as parts of a multi-part MIME message. The response to a request will always include the TPT for the current segment. It may include TPTs for one or more future segments as well.

The locator of TDOs and Content Items can be moved.

Networks and stations will often need to provide their own HTTP servers for delivering TDOs and content items (files) used by TDOs. When this is done, the baseURL in the TPT can be adjusted to reflect the location of the server.

Multiple Segments can be combined into one segment.

In order to thoroughly obfuscate boundaries between segments, the TPTs and AMFs for multiple segments can be combined into a single TPT and AMF. The steps required to do this includes:

1. Identify the set of segments to be combined.
2. Create a new TPT with a new segmentId.
3. If any of the segments being combined have live activations, provide a relay server that provides access to all of them, and put the parameters for this server in the "LiveTrigger" element.
4. Apply the baseURL for each segment as needed to get the full TDO and ContentItem URLs. (It may be possible to identify a shorter baseURL that is common to all the segments being combined, and retain that as a baseURL for the combined segment.)
5. Revise appId values as needed to remove conflicts.
6. Insert into the new TPT all the revised TDO elements for all the segments being combined.
7. Create a new AMF with segmentId equal to the new segmentId of the combined TPT.
8. Select an appropriate new "beginMT" value for the new AMF.

9. Adjust the targetId values of all the Activation elements in the AMF files for the segments being combined to reflect any changes in appId values.

10. Adjust the startTime and endTime values of all the Activation elements in the AMF files for the segments being combined to reflect the new "beginMT" value and the broadcast schedule for the segments being combined.

11. Insert all the revised Activation elements into the new AMF.

FIG. 8 is a diagram showing an XML schema for providing URL information which is a part of a response to a TPT request according to an embodiment of the present invention.

The TPT may be delivered via a broadcast stream. If the TPT is delivered via a broadcast stream, the TPT may be changed to a binary format. If the TPT is delivered via the broadcast stream, the TPT may be delivered according to an NRT transmission method. If the TPT is delivered in NRT, the TPT may be compressed to an NRT private section including one TPT per table section. In this case, a subnet_id field in the NRT private section may be used as a sequence number for identifying other table instances in a serving signaling channel (SSC).

The TPT may be delivered via the Internet. If the TPT is delivered via the Internet, the TPT may be delivered via HTTP. The URL of the TPT for the current segment may be identified using <domain name part> and/or <directory path> in the time base message. The receiver may request transmission of the TPT from a server for providing the TPT. The response to the request for transmission of the TPT may include only the TPT or may include a 2-part MIME message. A first part of the 2-part MIME message may include the requested TPT and a second part of the 2-part MIME message may include a list of URLs. The list of URLs may be transmitted in the form of an XML document shown in FIG. 8.

The list of the URLs in the form of the XML document may include a UrlList element, a TptUrl element and/or an NrtSignalingUrl element.

The UrlList element includes a list of URLs used in a receiver.

The TptUrl element includes a URL for providing a TPT for a future segment. If a plurality of TptUrl elements is included, the TptUrl elements may be assigned according to the order of segments in a broadcast.

The NrtSignalingUrl element includes the URL of the server from which the receiver can acquire an NRT signaling table for virtual channels in a current broadcast stream.

FIG. 9 is a diagram showing an XML schema for providing URL information which is a part of a response to a TPT request according to another embodiment of the present invention.

A broadcaster may use information about the type of broadcast content currently viewed or consumed by each receiver and a preferred data broadcast program in a broadcast business. In this case, the receiver needs to transmit information about user preference for broadcast content consumed by each receiver to a specific server. Accordingly, an element indicating the URL of the server for usage reporting will be added to a URL list element of the URL information provided by the receiver.

A URL List contains certain URLs of potential use to a receiver presenting interactive services. The URL List may contain at least one of URLs of TPTs for one or more future segments, URL of an NRT Signaling Server from which information about stand-alone NRT services in the broadcast stream can be retrieved, and URL of a Usage Reporting Server to which usage reports can be sent.

The URL List shall be an XML document containing a "UrlList" element that conforms to the schema definitions in the XML schema.

The XML schema of URL List element includes UrlList element, TptUrl element, and/or NrtSignalingUrl element.

UrlList element contains a list of URLs that are useful to a receiver.

TptUrl element of the UrlList element shall contain the URL of a TPT for a future segment. When multiple TptUrl elements are included, they shall be arranged in order of the appearance of the segments in the broadcast.

NrtSignalingUrl element of the UrlList element shall contain the URL of a server where receivers can obtain NRT signaling tables for all the virtual channels in the current broadcast stream.

UrsUrl element of the UrlList element shall contain the URL of a server where receivers can send usage (e.g. audience measurement) reports, using a certain protocol described in this application.

In one embodiment of the present invention, information included in the UsrUrl may include the URL of the usage reporting server. In this case, the receiver may perform usage reporting with respect to the usage reporting server according to a predetermined protocol (e.g., a data structure, an XML file, etc.).

According to another embodiment of the present invention, information included in the UsrUrl element may identify the TDO executed at a web browser of the receiver. In this case, the UsrUrl element indicates the location of the usage reporting TDO and the TDO may directly gather and report information about broadcast content stored in or currently consumed by the receiver using the API (e.g., file APIs or usage reporting APIs) of the web browser of the receiver. That is, usage reporting may be performed through the TDO. In one embodiment, the TDO may use JavaScript API "XMLHttpRequest" to transmit the gathered data to the specific server.

FIG. 10 is a diagram showing the syntax of a trigger according to an embodiment of the present invention.

The broadcast may provide two models of interactive additional data service (or interactive broadcast service/content) to the user. One of the models is a triggered declarative object (TDO) model and the other thereof is a direct execution model.

In the TDO model signals are delivered in the broadcast stream or via the Internet in order to initiate TDO events, such as launching a TDO, terminating a TDO, or prompting some task by a TDO. These events are initiated at specific times, typically synchronized with the audio-video program. When a TDO is launched, it provides the interactive features it is programmed to provide.

In the direct execution model, a Declarative Object (DO) is launched automatically as soon as the virtual channel is selected. It communicates over the Internet with a backend server via a "Synchronized Content Protocol." The server gives detailed instructions for providing interactive features—creating displays in specific locations on the screen, conducting polls, launching other specialized DOs, etc., all synchronized with the audio-video program. (For the near term the Synchronized Content Protocol is proprietary to a particular broadcaster, but it could be standardized at some future time.)

Most of this section deals with the signaling for the TDO model, but the signaling necessary to launch the DO for the Direct Execution model is included as well.

The basic concept behind the TDO model is that the files that make up a TDO, and the data files to be used by a TDO to take some action, all need some amount of time to be delivered to a receiver, given their size. While the user experience of the interactive elements can be authored prior to the broadcast of the content, certain behaviors must be carefully timed to coincide with events in the program itself, for example the occurrence of a commercial advertising segment.

The TDO model separates the delivery of declarative objects and associated data, scripts, text and graphics from the signaling of the specific timing of the playout of interactive events.

Referring to FIG. 9, syntax for the Trigger is described. As mentioned before, both Activation messages and Time Base messages can have the general "Trigger" format under certain delivery circumstances. The syntactic definition here is described using the Augmented Backus-Naur Form (ABNF) grammar, except that the vertical bar symbol "|" is used to designate alternatives. Rules are separated from definitions by an equal "=", indentation is used to continue a rule definition over more than one line, literals are quoted with " ", parentheses "(" and ")" are used to group elements, optional elements are enclosed in "[" and "]" brackets, and elements may be preceded with <n>* to designate n or more repetitions of the following element; n defaults to 0. And elements may be preceded with <n>*<m> designate n or more repetitions and m or less repetitions of the following element. This Trigger syntax is based on the absolute URI excluding the <scheme> and "://" portion.

The trigger may include locator_part and terms. Terms may be omitted. If terms are present, locator_part and terms may be connected by '?'.

The locator_part may include a hostname part and a path_segments part, which may be connected by '/'.

The hostname may include domainlabel and toplabel, and domainlabel may be repeated 0 times or more along with '.'. That is, hostname may include repeated domainlabel connected with toplabel or include only toplabel.

domainlabel may include one alphanum or include alphanum or "-" repeatedly inserted between alphanum and alphanum 0 times or more.

Here, alphanum may mean alpha or digit.

Here, alpha may be one of lowalpha or upalpha.

Here, lowalpha may be one of a, b, c, d, e, f, g, h, i, j, k, l, m, n, o, p, q, r, s, t, u, v, w, x, y, and z.

Here, upalpha may be one of A, B, C, D, E, F, G, H, I, J, K, L, M, N, O, P, Q, R, S, T, U, V, W, X, Y, and Z.

Here, digit may be one of 0, 1, 2, 3, 4, 5, 6, 7, 8, and 9.

toplabel includes one alpha or include alphanum or "-" repeatedly inserted between alpha and alphanum 0 times or more.

path_segments includes one segment, which is followed by segment repeated 0 times or more. At this time, segments may be connected by '/'.

Here, segment includes alphanum which is repeated once or more.

Terms may include one of event_time or media_time, which may be followed by spread or others. Spread and others may be omitted. If spread and others are present, '&' may be placed ahead of spread and others and spread and others may be placed after event_time or media_time.

Here, spread may include digit repeated once or more after 's='.

Event_time may include digit repeated once or more after 'e=' or include hexdigit repeated once or more or seven times or less after '&t='. '&t=' and the back part thereof may be omitted.

Here, hexdigit may be one of 0, 1, 2, 3, 4, 5, 6, 7, 8, 9, a, b, c, d, e and f.

Media_time may include hexdigit repeated once or more or less than seven times after 'm='.

Others may include one "other" or "other" followed by '&' and "other".

Here, other may include resv_cmd and alphanum which are repeated once or more and are connected by '='.

Here, resv_cmd may be alphanum excluding 'c', 'e', 'E', 'm', 'M', 's', 'S', 't', and 'T'.

The length of the trigger may not exceed 52 bytes. In addition, the hostname portion of the Trigger can be a registered Internet domain name.

A Trigger can be considered to consist of three parts.
<domain name part>/<directory path>[?<parameters>]

The <domain name part> can be a registered domain name, <directory path> can be a path as it would appear in a URI.

The <domain name part> references a registered Internet domain name. The <directory path> is an arbitrary character string identifying a directory path under the control and management of the entity who owns rights to the identified domain name.

In the TDO model, the combination of <domain name part> and <directory path> shall uniquely identify a TPT that can be processed by a receiver to add interactivity to the associated content.

In the direct execution model, the combination of <domain name part> and <directory path> shall uniquely identify the DO to be launched.

The combination of <domain name part> and <directory path> can be the URL of an Internet location where the TPT for the current segment can be obtained.

That is, the trigger may identify the TPT using <domain name part> and <directory path>. Through <domain name part> and <directory path>, it is possible to confirm the TPT to which the trigger applies. The role performed by applying the trigger to the TPT depends on <parameters>.

Hereinafter, <parameters> will be described.

<parameters> may consist of one or more of "event_time", "media_time", or "spread".

Next, "event_time", "media_time" and "spread" of the syntax shown in FIG. 4 will be described.

event_time="e=" 1*digit ["&t=" 1*7hexdigit]
media_time="m=" 1*7hexdigit
spread ="s=" 1*digit The "event_time" term can be used in an Activation trigger to identify the targeted event ("e=" term) and the time the event should be activated ("t=" term). When the "t=" term is absent, that means the event should be activated at the time the trigger arrives.

That is, "e=", which is an interactive event ID term, can reference the appID in the associated TPT of the TDO targeted by the event, the eventID of the specific event, and the dataID of the Data element to be used for this event activation.

"t=", which is an optional timing value term, can indicate a new media timing for the designated event. If the "t=" part is not present, that can mean the timing for the designated event is the arrival time of the Trigger.

The "media_time" term ("m=" term) can be used in a Time base trigger to identify the current time relative to the time base represented by the Time base trigger. Content identifier information ("c=" term) for identifying currently displayed content may be further included in media_time. For "c=" term, the direct execution model will be described below.

That is, "m=", which is a media timestamp term, followed by a character string of 1 to 8 characters in length representing a hexadecimal number, can indicate the current Media Time.

The "spread" term can be used to indicate that any action taken in response to a Time base trigger (such as retrieving a TPT from a server) or an Activation trigger (such as causing a TDO to access a server) should be delayed a random amount of time, to spread out the workload on the server.

"s=" term can indicate the number of seconds of time over which all receivers should attempt to access the Internet server identified in the Trigger. Each individual receiver can be expected to derive a random time within the designated interval and delay the access request by that amount, thereby spreading in time the peak in demand that might otherwise occur at the first appearance of a Trigger at the receiver.

A Trigger containing a <media time> parameter can be called a Time base trigger, since it is used to establish a time base for event times.

A Trigger containing an <event time> parameter can be called an Activation Trigger, since it sets an activation time for an event.

FIG. 11 is a diagram showing a part of a TPT of a binary format according to an embodiment of the present invention.

FIG. 12 is a diagram showing another part of a TPT of a binary format according to an embodiment of the present invention.

FIG. 13 is a diagram showing another part of a TPT of a binary format according to an embodiment of the present invention.

FIG. 14 is a diagram showing another part of a TPT of a binary format according to an embodiment of the present invention.

FIG. 15 is a diagram showing another part of a TPT of a binary format according to an embodiment of the present invention.

That is, FIGS. 11 to 15 show the whole structure of the TPT of the binary format according to the embodiment of the present invention.

When TPTs are delivered in the broadcast stream, TPTs are translated into a binary NRT-style signaling table format and encapsulated in NRT-style private sections, one TPT per table instance. The subnet_id field in the NRT private section syntax is used as a sequence number to distinguish between different table instances in the Service Signaling Channel.

Among the elements or information described with reference to FIGS. 3 and 4, some elements or information may be omitted from the TPT of the binary format. In this case, the omitted elements or information may be compressed and transmitted in a header for transmission of the TPT of the binary format in the broadcast stream. For example, the major/minor protocol Version element, the serviced element and/or the tptVersion element may be omitted from the TPT of the binary format.

TPT of binary format includes expire_date_included field, segment_id_length field, segment_id field, base_URL_length field, base_URL field, expire_date field, trigger_server_URL_length field, trigger_server_URL field, trigger_delivery_type field, poll_period field, num_apps_in_table field, app_id field, app_type_included field, app_name_included field, global_id_included field, app_version_included field, cookie_space_included field, frequency_of_use_included field, expire_date_included field, app_type field, app_name_length field, app_name field, global_id_length field, global_id field, app_version field, cookie_space field, frequency_of_use field, expire_date field, test_app field, available_on_internet field, available_in_broadcast field, number_URLs field, URL_length field, URL field, number_content_items field, updates_avail field, avail_internet field, avail_broadcast field, content_size_included field, number_URLs field, URL_length field, URL field, content_size field, num_content_descriptors field, content_descriptor( ) field, number_events field, event_id field, action field, destination_included field, diffusion_included field, data_included field, destination field, diffusion field, data_size field, data_bytes field, num_app_descriptors field, app_descriptor( ) field, num_TPT_descriptors field, and/or TPT_descriptor( ) field.

expire_date_included field shall indicate whether the expire_date field is included. The value '1' means it is included; the value '0' means it is not included.

segment_id_length field shall indicate the length in bytes of the segment_id field.

segment_id field shall contain the bytes of the segment id, which shall have the same semantics as the "id" attribute of the TPT XML format.

base_URL_length field shall indicate the length in bytes of the base_URL field.

base_URL field shall contain the bytes of the base URL, which shall have the same semantics as the baseURL attribute of the TPT XML format.

expire_date field shall indicate the date and time of the expiration of the information included in this TPT instance when present. If the receiver caches the TPT, it can be re-used until the expireDate. The unsigned integer shall be interpreted as the number of GPS seconds since 00:00:00 UTC, 6 Jan. 1980, minus the GPS-UTC_offset, as that term is defined in the ATSC PSIP standard (PSIP).

trigger_server_URL_length field shall indicate the length in bytes of the trigger_server_URL field. When the value of this field is 0. It shall indicate that internet delivery of individual Activation Triggers is not available.

trigger_server_URL field shall contain the bytes of the Trigger Server URL, which shall have the same semantics as the URL attribute of the LiveTrigger element of the TPT XML format, when the value of the trigger_server_URL_length field is not 0.

trigger_delivery_type shall indicate the delivery mode of individual Activation Triggers over the Internet. The value '0' shall indicate that HTTP short polling is being used. The value '1' shall indicate that either HTTP long polling or HTTP streaming is being used.

poll_period field shall indicate the recommended number of seconds between polls, when HTTP short polling is being used.

num_apps_in_table field shall indicate the number of applications (TDOs) described in this TPT instance.

app_id field shall contain an identifier for this application (the application described in this iteration of the num_apps_in_table loop. It shall be unique within this TPT instance.

app_type_included field shall indicate whether the app_type field is included for this application. The value '1' means it is included. The value '0' means it is not included.

app_name_included field shall indicate whether the app_name field is included for this application. The value '1' means it is included; the value '0' means it is not included.

global_id_included field shall indicate whether the global_id field is included for this application. The value '1' means it is included. The value '0' means it is not included.

app_version_included field shall indicate whether the app_version field is included for this application. The value '1' means it is included. The value '0' means it is not included.

cookie_space_included field shall indicate whether the cookie_space field is included for this application. The value '1' means it is included. The value '0' means it is not included.

frequency_of_use_included field shall indicate whether the frequency_of_use field is included for this application. The value '1' means it is included. The value '0' means it is not included.

expire_date_included field shall indicate whether the expire_date field is included for this application. The value '1' means it is included. The value '0' means it is not included.

app_type field shall indicate the format type of this application when present. The value 0 shall indicate that the application is a TDO conforming to the specifications in this version of this standard. If this field is not present, the value shall default to 0. Other values representing other formats could be defined in future versions of this standard.

app_name_length field shall indicate the length in bytes of the app_name field immediately following it, when present. The value 0 for this field shall indicate that no app_name field is present for this application.

app_name field shall have the same semantics as the appName attribute of the TDO element in the TPT XML format, when present.

global_id_length field shall indicate the length in bytes of the global_id field immediately following it, when present. The value 0 for this field shall indicate that no global_id field is present for this application.

global_id field shall have the same semantics as the globalId attribute of the TDO element in the TPT XML format, when present.

app_version field has the same semantics as the appVersion attribute of the TDO element in the TPT XML format, when present.

cookie_space field shall have the same semantics as the cookieSpace attribute of the TDO element in the TPT XML format, when present.

frequency_of_use field shall have the same semantics as the frequencyOfUse attribute of the TDO element in the TPT XML format, when present.

expire_date field shall have the same semantics as the expireDate attribute of the TDO element in the TPT XML format, when present.

test_app field indicates whether or not this application is a test application, intended to be ignored by ordinary receivers. The value '1' shall mean it is a test application. The value '0' shall mean it is not a test application.

available_on_internet field indicates whether or not this application is available via the Internet or not. The value '1' shall mean it is available via the Internet; the value '0' shall mean it is not available via the Internet.

available_in_broadcast field indicates whether or not this application is available via the broadcast or not. The value '1' shall mean it is available via the broadcast. The value '0' shall mean it is not available via the broadcast.

number_URLs field shall indicate the number of files that comprise this application.

URL_length field shall indicate the length of the URL field following it.

URL field shall have the same semantics as the URL attribute of the TDO element in the TPT XML format.

number_content_items field shall indicate the number of content items that are to be downloaded for use by this application.

updates_avail field indicates whether this content item will be updated from time to time—i.e., whether it a set of static files or a real-time data feed. The value '1' shall indicate that it will be updated. The value '0' shall indicate that it will not be updated.

avail_internet field indicates whether the file(s) that comprise this content item can be downloaded via the Internet or not. The value '1' shall mean that they are available for downloading via the Internet. The value '0' shall mean they are not available.

avail_broadcast field indicates whether the file(s) that comprise this content item can be downloaded via the broadcast or not. The value '1' shall mean that they are available for downloading via the broadcast. The value '0' shall mean they are not available.

content_size_included field indicates whether or not the content_size field is included or not for this application. The value '1' shall mean it is included; the value '0' shall mean it is not included.

number_URLs field shall indicate the number of files that comprise this content item.

URL_length field shall indicate the length of the URL field following it.

URL field shall have the same semantics as the URL attribute of the ContentItem child element of the TDO element in the TPT XML format.

content_size field shall have the same semantics as the contentSize attribute of the ContentItem child element of the TDO element in the TPT XML format, when present.

num_content_descriptors field shall indicate the number of content descriptors in the descriptor loop immediately following it.

content_descriptor( ) field shall be a descriptor conforming to the MPEG-2 descriptor format (tag, length, data), as specified in the MPEG-2 Systems standard [13818-1]. It shall provide additional information about this content item. Among the descriptors that may be included in this descriptor loop is the Capabilities descriptor, indicating receiver capabilities needed for a meaningful presentation of this content item.

number_events field shall indicate the number of events defined for this TDO.

event_id field shall contain an identifier for this event (the event described in this iteration of the number_events loop). It shall be unique within the scope of this application. The event is referenced within Activation Triggers by the combination of app_id and event_id.

action field shall have the same semantics as the action attribute of the Event child element of the TDO element in the TPT XML format.

destination_included field shall indicate whether or not the destination field is included for this event. The value '1' shall indicate that it is included. The value '0' shall indicate that it is not included.

diffusion_included field shall indicate whether or not the diffusion field is included for this event. The value '1' shall indicate that it is included. The value '0' shall indicate that it is not included.

data_included field shall indicate whether or not the data_size and data_bytes fields are included for this event. The value '1' shall indicate that they are included. The value '0' shall indicate that they are not included.

destination field shall be the same as the semantics of the destination attribute of the Event child element of the TDO element in the TPT XML format, when present.

diffusion field shall be the same as the semantics of the diffusion attribute of the Event child element of the TDO element in the TPT XML format, when present.

data_size field shall indicate the size of the data_bytes field immediately following it, when present.

data_bytes field, when present, shall provide data related to this event. Whenever the event is activated, the target application will be able to read the data and use it to help carry out the desired action. The content of this field shall be identical to the content of the corresponding Data child element of the corresponding Event child element of the corresponding TDO element in the TPT XML format, except that this field contains the raw binary value, and the Data element in the TPT XML format contains a base64 encoding of the binary value.

num_app_descriptors field shall indicate the number of descriptors in the descriptor loop immediately following it.

app_descriptor( ) field shall be a descriptor conforming to the MPEG-2 descriptor format (tag, length, data), as specified in the MPEG-2 Systems standard [13818-1]. It shall provide additional information about this application (TDO). Among the descriptors that may be included in this descriptor loop is the Capabilities descriptor defined in section 8.3 of the ATSC NRT standard [NRT], indicating receiver capabilities needed for a meaningful presentation of this application.

num_TPT_descriptors field shall indicate the number of descriptors in the descriptor loop immediately following it.

TPT_descriptor( ) field shall be a descriptor conforming to the MPEG-2 descriptor format (tag, length, data), as specified in the MPEG-2 Systems standard [13818-1]. It shall provide additional information about this TPT. Among the descriptors that may be included in this descriptor loop is the Capabilities descriptor defined in section 8.3 of the ATSC NRT standard [NRT], indicating receiver capabilities needed for a meaningful presentation of the interactive service represented by this TPT.

FIG. 16 shows the structure of TPT section according to an embodiment of the present invention.

When TPTs are delivered in the broadcast stream, the TPT of binary format shall be used for each TPT instance (where a TPT instance is defined by the value of its segment_id field). Each TPT shall be encapsulated in NRT-style private sections with structure as defined below, by dividing each TPT into blocks and inserting the blocks into the tpt_bytes( ) fields of sections that have a common value of table_id, protocol_version TPT_data_version and sequence_number fields. The blocks shall be inserted into the sections in order of ascending section_number field values. The private sections shall be carried in the Service Signaling Channel (SSC) of the IP subnet of the virtual channel to which the TPT pertains, as the terms "Service Signaling Channel" and "IP subnet" are defined in the ATSC NRT standard [NRT]. The sequence_number fields in the sections are used to distinguish different TPT instances carried in the same SSC.

The semantics of the section_syntax_indicator, private_indicator, and section_length fields shall be the same as the semantics of the fields of the same names in the NRT_information_table_section( ) defined in the ATSC NRT standard [NRT].

A TPT section includes table_id field, protocol_version field, sequence_number field, TPT_data_version field, current_next_indicator field, section_number field, last_section_number field, service_id field, and/or tpt_bytes( ) field.

table_id field shall identify this table section as belonging to a TDO Parameters Table instance.

protocol_version field shall indicate the major version number of the definition of this table and the TPT instance carried in it, and the low order 4 bits shall indicate the minor version number. The major version number for this version of this standard shall be set to 1. Receivers are expected to discard instances of the AMT indicating major version values they are not equipped to support. The minor version number for this version of the standard shall be set to 0. Receivers are expected to not discard instances of the AMT indicating minor version values they are not equipped to support. In this case they are expected to ignore any descriptors they do not recognize, and to ignore any fields that they do not support.

sequence_number field shall be the same as the sequence_number of all other sections of this TPT instance and different from the sequence_number of all sections of any other TPT instance in this Service Signaling Channel. The values of the sequence_number fields of the different TPT instances should reflect the order in which the segments appear in the broadcast stream.

TPT_data_version field shall indicate the version number of this TPT instance, where the TPT instance is defined by its segment_id. The version number shall be incremented by 1 modulo 32 when any field in the TPT instance changes.

current_next_indicator field shall always be set to '1' for TPT sections, indicating that the TPT sent is always the current TPT for the segment identified by its segment_id.

section_number field shall give the section number of this TPT instance section, where the TPT instance is identified by its segment_id. The section_number of the first section in an TPT instance shall be 0x00. The section_number shall be incremented by 1 with each additional section in the TPT instance.

last_section_number field shall give the number of the last section (i.e., the section with the highest section_number) of the TPT instance of which this section is a part.

service_id field shall specify the service_id associated with the interactive service offering the content items described in this table instance.

tpt_bytes( ) field shall consist of a block of the TPT instance carried in part by this section. When the tpt_bytes( ) fields of all the sections of this table instance are concatenated in order of their section_number fields, the result shall be the complete TPT instance.

Figure 17:
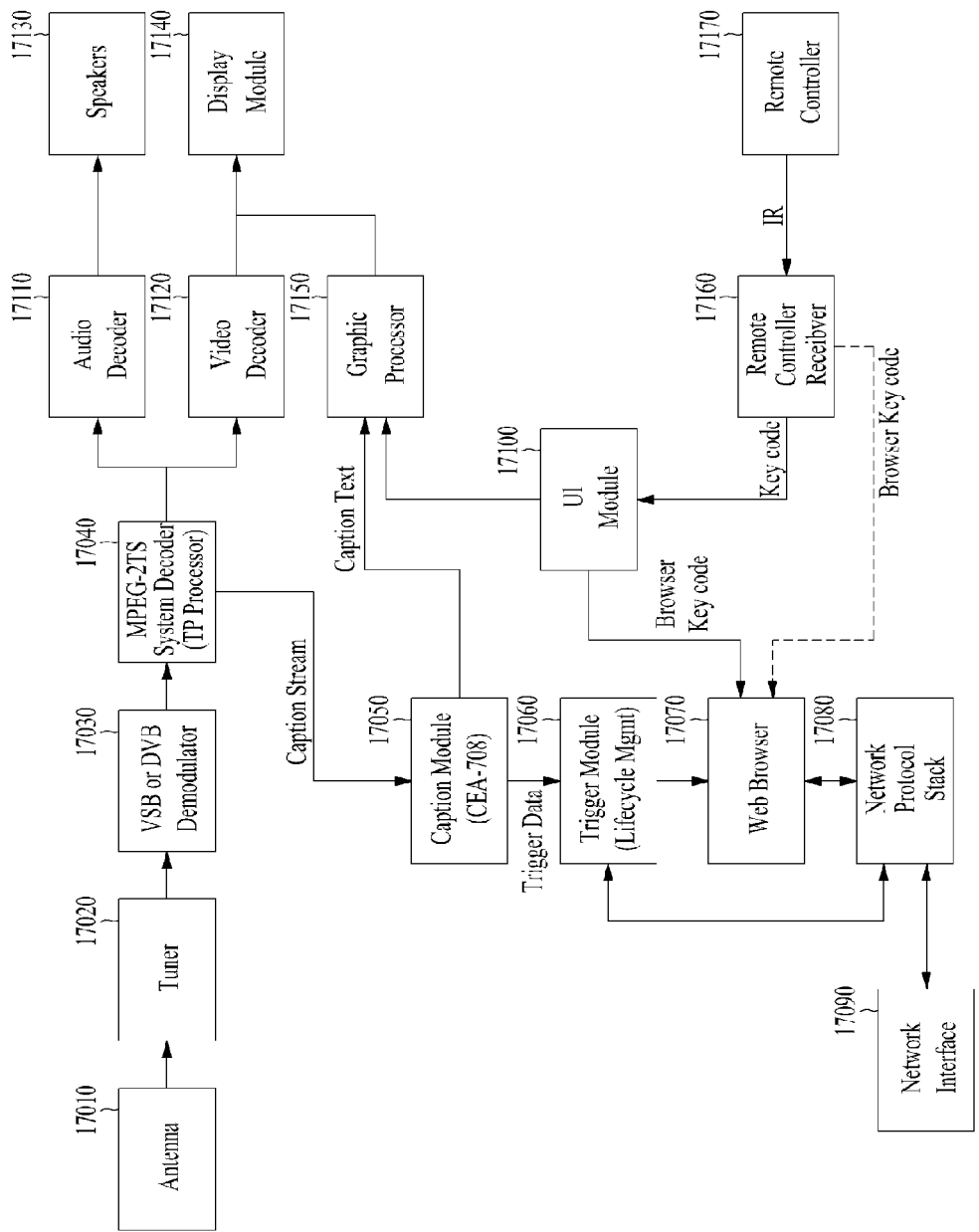
FIG. 17 is a diagram showing the structure of a receiver according to an embodiment of the present invention.

FIG. 17 is a diagram showing the structure of a receiver according to an embodiment of the present invention.

In the embodiment of the present invention, the receiver may include an antenna 17010, a tuner 17020, a VSB or DVB demodulator 17030, an MPEG-2TS System Decoder 17040, a caption module 17050, a trigger module 17060, a web browser 17070, a network protocol stack 17080, a network interface 17090, a UI module 17100, an audio decoder 17110, a video decoder 17120, a speaker 17130, a display module 17140, a graphic processor 17150, a remote controller receiver 17160 and/or a remote controller 17170.

The antenna 17010 may receive a broadcast signal according to a broadcast stream.

The tuner 17020 may seek or tune to a channel of the receiver and may include a radio frequency amplifier, a local oscillator, a frequency conversion and input circuit, a seeker, etc.

The VSB or DVB demodulator 17030 may demodulate a VSB signal or a DVB signal. The VSB or DVB demodulator 17030 may restore the modulated VSB (Vestigial Side Band) or DVB (e.g., OFDM-modulated signal) to an original signal.

The MPEG-2 TS system decoder 17040 decodes the transport stream (TS) of the demodulated signal. The MPEG-2 TS system decoder 17040 may obtain a caption stream from the transport stream and deliver the caption stream to the caption module 17050. The MPEG-2 TS system decoder 17040 may send the decoded audio and video signal to the audio decoder 17110 or/and the video decoder 17120.

The caption module 17050 may receive the caption stream. The caption module 17050 may monitor service #6 or other services and determine whether service #6 or services for transmitting the trigger is selected and sent to the trigger module 17060 or whether caption text is processed and displayed on a screen. Trigger data may be delivered to the trigger module 17060. Other caption services may be subjected to caption text processing and sent to the graphic processor 17150.

The trigger module 17060 may parse trigger, TPT and/or AMT information and process the parsed data. The trigger module 17060 may access the network via the network protocol stack 17080 using the URI information value of the trigger. The URI information value may be the address of the HTTP server. The trigger module 17060 may analyze the TPT file content to obtain the TDO URL. In addition, the trigger module 17060 may parse the AMT to process data. Other information may be obtained through parsing. After the AMT message has been received, the TDO URL corresponding to the web browser is delivered according to a predetermined time and operation or the currently operating TDO may be stopped at a predetermined time. This corresponds to a TDO action and the trigger module 17060 may send a command to the web browser to operate. The trigger module configured to gather a plurality of TPT parameter table sections each of which includes each of a plurality of TPT parameter blocks based on the location information in the trigger, wherein the TPT parameter table is divided into the plurality of TPT parameter blocks, and form the TPT parameter table containing metadata about applications and interactive broadcast events targeted to the applications using the plurality of parameter blocks.

The web browser 17070 may receive the command from the trigger module 17060, a browser key code from the UI module 17100 and a browser key code from the remote controller receiver 17160 and communicate with the network protocol stack 17080.

The network protocol stack 17080 may communicate with the trigger module 17060 and the web browser to access the server via the network interface 17090.

The network interface 17090 performs common connection of several other apparatuses or connection of a network computer and an external network. The network interface may be connected to the server to download a TDO, a TPT, an AMT, etc.

The UI module 17100 may receive information input by a viewer using the remote controller 17170 through the remote controller receiver 17160. If the received information is related to a service using the network, the browser key code may be delivered to the web browser. If the received information is related to currently displayed video, the signal may be delivered to the display module 17140 via the graphic processor 17150.

The audio decoder 17110 may decode the audio signal received from the MPEG-2 TS System Decoder 17040. Thereafter, the decoded audio signal may be sent to the speaker and output to the viewer.

The video decoder 17120 may decode the video signal received from the MPEG-2 TS system decoder 17040. Thereafter, the decoded video signal may be sent to the display module 17140 to be output to the viewer.

The speakers 17130 may output the audio signal to the viewer.

The display module 17140 may output the video signal to the viewer.

The graphic processor 17150 may perform graphic processing with respect to the caption text received from the caption module 17050 and the viewer input information received from the UI module 17100. The processed information may be delivered to the display module 17140.

The remote controller receiver 17160 may receive information from the remote controller 17170. At this time, the key code may be delivered to the UI module 17100 and the browser key code may be delivered to the web browser.

The remote controller 17170 delivers the signal input by the viewer to the remote controller receiver 17160. The remote controller 17170 may receive viewer input for changing a virtual channel. In addition, the remote controller may receive information selected by the viewer with respect to the application. The remote controller 17170 may deliver the received information to the remote controller receiver 17160. At this time, the information may be remotely delivered using infrared (IR) light at a distance out of a predetermined range.

Figure 18:
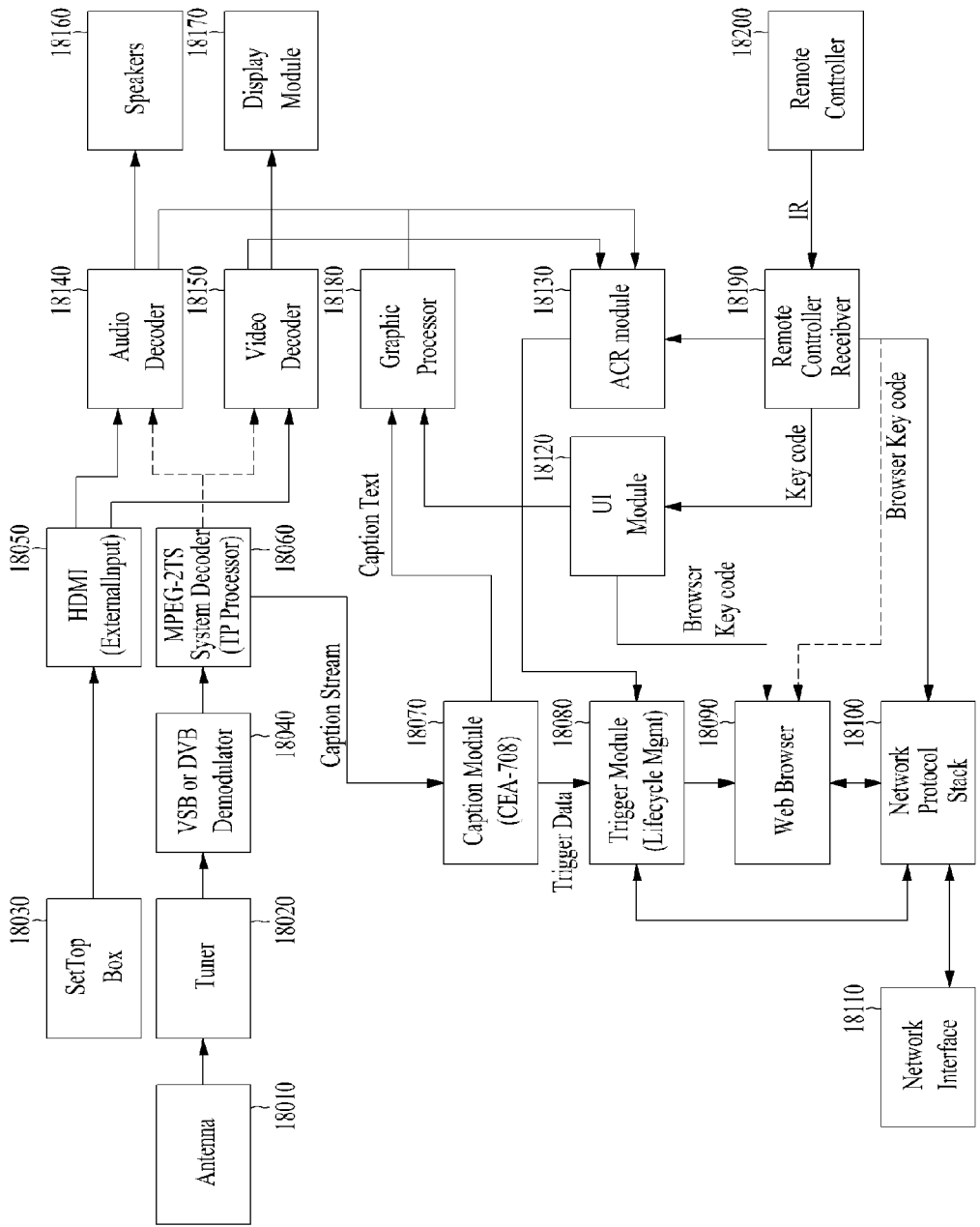
FIG. 18 is a diagram showing the structure of a receiver according to another embodiment of the present invention.

FIG. 18 is a diagram showing the structure of a receiver according to another embodiment of the present invention. In the case, a set top box can receive a broadcast signal and transmit a processed broadcast signal to a broadcast receiver via a high definition multimedia interface (HDMI) or an external interface.

The receiver may include an antenna 18010, a tuner 18020, a Set-Top Box 18030, a VSB or DVB demodulator 18040, a HDMI interface 18050, a MPEG-2 TS system decoder 18060, a caption module 18070, a trigger module 18080, a web browser 18090, a network protocol stack 18100, a network interface 18110, a UI module 18120, an ACR module 18130, an audio decoder 18140, a video decoder 18150, a speaker 18160, a display module 18170, a graphic processor 18180, a remote controller receiver 18190, and a remote controller 18200.

In this case, since video and audio of a broadcast stream is raw data, a trigger included in a caption stream may not be received. Details of the present invention will be described below.

Here, the modules excluding the Set-Top Box 18030, the HDMI 18050 and the ACR module 18130 are similar to the modules described in the embodiment of FIG. 17 in terms of the role.

The Set-Top Box 18030 may restore a compressed signal received from the video server through a digital network to an original video and audio signal. The TV may be an Internet user interface.

The HDMI 18050 may be a high-definition multimedia interface which is a non-compression digital video/audio interface standard. The HDMI 18050 may provide an interface between the Set-Top Box 18030 and an AV apparatus, that is, the audio decoder 18140 and the video decoder 18150.

The ACR module 18130 may automatically recognize broadcast content from the audio decoder 18140 and the video decoder 18150. Based on the currently recognized content, a query may be sent to the ACR server via the trigger module 18080 and the network interface 18110 to receive the TPT/AMT for the trigger.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

According to the present invention, it is possible to provide an interactive broadcast service or an interactive broadcast event related to broadcast content using an existing broadcast system.

According to the present invention, it is possible to accurately confirm when additional information related to broadcast content is displayed and to provide the additional information to a user at an appropriate time.

According to the present invention, it is possible to obtain additional information related to broadcast content and to provide the additional information to a viewer at an appropriate time even in a device which does not directly receive a broadcast signal.

Various embodiments have been described in the best mode for carrying out the invention.

The present invention is applicable to fields related to broadcast service provision.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing a broadcast service at a transmitter, the method comprising:
    generating a parameter element containing metadata about applications of a segment and events targeted to the applications;
    generating an activation message element used for delivering activation triggers which set activation times for events;
    generating a message including the parameter element as a first part and the activation message element as a second part;
    transmitting the broadcast service via a broadcast channel; and
    transmitting the generated message via an internet network,
    wherein the activation message element includes a target application attribute identifying a target application for an activation command.

2. The method of claim 1, wherein the activation message element further includes a target event attribute identifying a target event for the activation command, and
    wherein the target event is contained in the target application identified by the target application attribute.

3. The method of claim 2, wherein the parameter element includes an application identification attribute identifying an application within a scope of the parameter element and an event identification attribute identifying an event within a scope of the application contacting the event,
    wherein the target application attribute of the activation message element matches the application identification attribute of the parameter element, and the target event attribute of the activation message element matches the event identification attribute of the parameter element.

4. The method of claim 3, wherein the parameter element further includes an action attribute indicating a type of action to be applied when the event is activated by the activation command.

5. The method of claim 4, wherein the type of action includes a prepare type, and
    wherein the target application goes to a ready state, when the prepare type arrives and the target application is in a released state.

6. The method of claim 4, wherein the type of action includes an execute type, and
wherein the target application goes to an active state, when the execute type arrives and the target application is not already in the active state.

7. The method of claim 4, wherein the type of action includes a suspend type, and
wherein the target application goes to a suspend state, when the suspend type arrives and the target application is in the active state.

8. A receiver for processing a broadcast service, the receiver comprising:
a receiving device configured to receive the broadcast service via a broadcast channel;
a network interface configured to receive message via an internet network, wherein the message includes a parameter element as a first part and an activation message element as a second part;
an extracting device configured to extract the parameter element containing metadata about applications of a segment and events targeted to the applications, and the activation message element used for delivering activation triggers which set activation times for events; and
a processor configured to provide the broadcast service and the applications based on the parameter element and the activation message element,
wherein the activation message element includes a target application attribute identifying a target application for an activation command.

9. The apparatus of claim 8, wherein the activation message element further includes a target event attribute identifying a target event for the activation command, and wherein the target event is contained in the target application identified by the target application attribute.

10. The apparatus of claim 9, wherein the parameter element includes an application identification attribute identifying an application within a scope of the parameter element and an event identification attribute identifying an event within a scope of the application contacting the event,
wherein the target application attribute of the activation message element matches the application identification attribute of the parameter element, and the target event attribute of the activation message element matches the event identification attribute of the parameter element.

11. The apparatus of claim 10, wherein the parameter element further includes an action attribute indicating a type of action to be applied when the event is activated by the activation command.

12. The apparatus of claim 11, wherein the type of action includes a prepare type, and
wherein the target application goes to a ready state, when the prepare type arrives and the target application is in a released state.

13. The apparatus of claim 11, wherein the type of action includes an execute type, and
wherein the target application goes to an active state, when the execute type arrives and the target application is not already in the active state.

14. The apparatus of claim 11, wherein the type of action includes a suspend type, and
wherein the target application goes to a suspend state, when the suspend type arrives and the target application is in the active state.

* * * * *